(12) United States Patent
Saito et al.

(10) Patent No.: US 7,810,096 B2
(45) Date of Patent: Oct. 5, 2010

(54) COMPUTER EXECUTING MULTIPLE OPERATING SYSTEMS

(75) Inventors: Masahiko Saito, Hitachi (JP); Tadashi Kamiwaki, Tokai-mura (JP); Tomoaki Nakamura, Hitachinaka (JP); Hiroshi Ohno, Hitachi (JP); Taro Inoue, Yamato (JP)

(73) Assignee: Hitachi, Ltd., Tokyo (JP)

( * ) Notice: Subject to any disclaimer, the term of this patent is extended or adjusted under 35 U.S.C. 154(b) by 620 days.

(21) Appl. No.: 11/025,966

(22) Filed: Jan. 3, 2005

(65) Prior Publication Data
US 2005/0149933 A1    Jul. 7, 2005

Related U.S. Application Data

(63) Continuation of application No. 09/495,897, filed on Feb. 2, 2000, now abandoned.

(30) Foreign Application Priority Data

Feb. 19, 1999    (JP)    ................................. 11-041032

(51) Int. Cl.
*G06F 9/46*    (2006.01)
(52) U.S. Cl. ....................... 718/103; 718/102
(58) Field of Classification Search .......... 718/100–108
See application file for complete search history.

(56) References Cited

U.S. PATENT DOCUMENTS

| | | | | |
|---|---|---|---|---|
| 4,481,583 A | * | 11/1984 | Mueller | ...................... 710/244 |
| 5,333,319 A | * | 7/1994 | Silen | ........................... 718/103 |
| 5,392,409 A | * | 2/1995 | Umeno et al. | ................... 718/1 |
| 5,483,647 A | * | 1/1996 | Yu et al. | ...................... 713/100 |
| 5,826,081 A | * | 10/1998 | Zolnowsky | ................. 718/103 |
| 6,157,989 A | * | 12/2000 | Collins et al. | ............... 711/151 |
| 6,631,394 B1 | * | 10/2003 | Ronkka et al. | .............. 718/100 |

(Continued)

FOREIGN PATENT DOCUMENTS

EP    0 427 067    5/1991

(Continued)

OTHER PUBLICATIONS

Lee et al. "Managing Multiple Disjoint Priority Orders in Priority Queues", 1994, INFOCOM'94, pp. 1183-1190.*

(Continued)

*Primary Examiner*—Lewis A Bullock, Jr.
*Assistant Examiner*—Jue Wang
(74) *Attorney, Agent, or Firm*—Kenyon & Kenyon LLP

(57) ABSTRACT

A computer system having a plurality of operating systems and a module for switching the operating systems in view of priorities of tasks to be performed by each of the operating systems. Each of the operating systems performing a plurality of processes or threads in accordance with the priorities assigned to these processes or threads has a module for notifying the computer system of the priority of the currently executing process or thread. The computer system includes a module for translating the priorities sent from each operating system into priorities (normalized priorities) common-throughout the computer system, and a module for comparing the normalized priorities obtained by the priority translation module in order to select and execute preferentially the operating system having a common priority higher than that of any other operating system.

16 Claims, 21 Drawing Sheets

U.S. PATENT DOCUMENTS 6,658,447 B2 * 12/2003 Cota-Robles ............... 718/103
6,678,712 B1 1/2004 McLaren et al.
6,715,016 B1 * 3/2004 Ohno et al. ................. 710/260

FOREIGN PATENT DOCUMENTS

| EP | 0 543 610 | 5/1993 |
|---|---|---|
| EP | 0 737 919 | 10/1996 |
| JP | 04-367037 | 12/1992 |
| JP | A 4-367037 | 12/1992 |
| JP | 05-108380 | 4/1993 |
| JP | A 5-108380 | 4/1993 |
| JP | 05-197577 | 8/1993 |
| JP | 06-004310 | 1/1994 |
| JP | A 10-55284 | 2/1998 |
| WO | WO 98/12635 | 3/1998 |
| WO | WO 99/38073 | 7/1999 |

OTHER PUBLICATIONS

Patent Abstracts of Japan, vol. 017, No. 624, Nov. 17, 1993 & JP 05-197577 A (NEC CORP), Aug. 6, 1993.

Office Action (Rejection Reasons Notification) issued in the Japanese priority Application No. Heisei 11-041032, Apr. 27, 2004 & translation theeof.

Japanese Office Action dated Apr. 27, 2004 and translation thereof.

Patent Abstracts of Japan, vol. 012, No. 097, Mar. 30, 1988 & JP 62-231339 A (Fuji Electric Co Ltd), Oct. 9, 1987.

The Survey of Hitachi Technology, Hitachi Hyouron, Japan. Hitachi Hyouron Corporation, Jan. 1999, vol. 81, No. 1, pp. 27-29.

* cited by examiner

COMPUTER EXECUTING MULTIPLE OPERATING SYSTEMS

This is a continuation of parent application Ser. No. 09/495,897 filed 2 Feb. 2000 now abandoned, which claims priority to JP 11-041032 filed 19 Feb. 1999, the contents of which are incorporated herein by reference.

FIELD OF THE INVENTION

The present invention relates to a computer executing any one of a plurality of operating systems being switched as needed and to a method for switching such operating systems. More particularly, the invention relates to a method for switching a plurality of operating systems each having a specific priority scheme.

BACKGROUND OF THE INVENTION

Heretofore, virtual machines (VM) have been known as a technique used by mainframes to run a plurality of operating systems on a single computer unit. According to the technique, a plurality of user tasks (processes and threads are generically called tasks hereunder) are executed while being switched on a plurality of virtual machines operating parallelly within the mainframe. A virtual machine is usually implemented as a process in the mainframe; a virtual machine may also be regarded as an operating system in view of its relationship to user tasks.

Generally, virtual machines are each assigned a predetermined time slice (allocated CPU time) in accordance with the priority of the virtual machine in question. Each virtual machine switches and runs user tasks within the assigned time slice. A technique for improving execution efficiency of such virtual machines is disclosed illustratively in JPA 5-197577, "Execution Priority Control System for Virtual Machines."

The technique cited above involves a plurality of virtual machines and a virtual machine monitor for controlling the multiple virtual machines. On starting or ending the execution of a high priority task such as a system task, a virtual machine notifies the virtual machine monitor of the priority of the task in question. In response, the virtual machine monitor changes the execution priority of the virtual machine in question to comply with the received priority. Where the execution priority of each virtual machine is changed to match the priority of the task to be performed thereby, control over virtual machines is said to be executed efficiently.

Meanwhile, improvements in the performance of microcomputers, especially those for embedded uses, along with enhanced functionality of operating systems, have inspired a need in users to run and dynamically switch a plurality of operating systems concurrently on a single computer.

In such applications as mechanical controls at factories and plants and car navigation systems, among others, emphasis is placed on a real-time response capability of responding to changes in the external environment in real time, as well as on high reliability that ensures long-time uninterrupted operation. For these reasons, many such applications adopt a real-time operating system (real-time OS) that is highly responsive to external changes and is compact and module-based in structure. However, while stressing the real-time responsiveness and reliability, the real-time OS tends to be short on amenities of human-oriented interface.

By contrast, business-use operating systems (business-use OS) installed in common personal computers (PC) have user-friendly interface features that typically permit image-based user manipulations. For that reason, there has been a growing need for utilizing the business-use OS in applications dominated by real-time OS's. However, because it primarily addresses interactive exchanges with human operators, the business-use OS stresses throughput rather than interrupt responsiveness. That is, under the business-use OS, processing may continue with interruptions inhibited for a relatively long time. The business-use OS is not as compact as the real-time OS in terms of structure and consequently is less reliable. As such, the business-use OS is not fit for round-the-clock or other extended operations.

Still, if a business-use OS and a real-time OS are run and switched as needed on a single computer as in the case of multiple virtual machines (i.e., operating systems) run on a mainframe, it is possible to take advance of the benefits of both systems: user-friendly interface on the one hand, and real-time responsiveness and reliability on the other hand. Given today's enhanced performance of microcomputers, the scheme of running a plurality of operating systems on one computer unit is no longer an exclusive prerogative of mainframes.

If the relevance of each operating system is taken into consideration, the simplest scheme of switching multiple operating systems will involve having a real-time OS run most of the time and replaced by a business-use OS only when executable real-time OS tasks do not exist. However, there is no simple way of putting any one individual task above others in terms of priority (e.g., making real-time OS tasks always higher in priority than business-use OS tasks).

FIG. 27 shows an example demonstrating that simple classification of tasks in terms of priority is difficult to achieve. The figure illustrates a typical constitution of a simplified car navigation system assumed to be made up of four tasks: (1) a position recognition task 370 for recognizing the driving position of the car; (2) a route searching task 371 for finding the shortest route to a destination; (3) an interface task 372 for processing inputs from buttons and touch panel controls of the system; and (4) a game task 373 started during a rest stop. The position recognition task and the route searching task generally demand quick response and high reliability and are run by a real-time OS 111, while a business-use OS 110 with its user-friendly interface carries out the interface task and game task. But route search generally requires performing huge amounts of calculations, which may take as long as several seconds in a single pass. If tasks are simply classified as described above, then processing of the interface task is necessarily halted during the route search calculations and no key input effected repeatedly by the user will be recognized during that period.

The car navigation system shown in FIG. 27 has a high priority assigned to the interface task. When that task is placed in an executable state, the business-use OS needs to be run preferentially. According to the above-cited conventional technique (for "Execution Priority Control System for Virtual Machines"), however, it is assumed that all virtual machines (i.e., operating systems) have the same functionality. In order to address changes in the environment, most real-time OS's generally have a far larger number of priority levels than their business-use counterparts. Furthermore, the real-time and business-use OS's may have their priority levels arranged in a mutually opposite direction in an extreme case: the smaller the priority value (close to "0"), the higher the priority for the real-time OS; the larger the priority value, the higher the priority for the business-use OS. In that case, if each of the two operating systems requests a virtual machine monitor for priority over the other, the virtual machine monitor will have difficulty determining which operating system to start preferentially. The conventional technique above is thus incapable of controlling in a unified manner the business-use and real-time OS's each having conceptually different functions.

SUMMARY OF THE INVENTION

It is therefore an object of the present invention to provide a computer having a multiple operating system controller for switching a plurality of different operating systems and selectively running one of them in consideration of the priorities of tasks to be performed by each operating system, whereby high-priority tasks are executed preferentially.

In carrying out the invention and according to one aspect thereof, there is provided a computer for switching and running a plurality of operating systems which execute a plurality of tasks according to their priorities. The computer performs the following:

(1) A priority monitoring process is carried out to monitor the priorities of tasks executed by the operating systems involved. Alternatively, a priority notification process may be implemented within each operating system for notification of the priority of the task currently performed thereby. However, some business-use or real-time OS's are incapable of additionally accommodating the priority notification process therein. It is in such cases that the priority monitoring process needs to be performed.

(2) A priority translation process is carried out whereby that priority of the currently executing task which is acquired from each operating system is translated into a priority common to all operating systems involved (a common priority is called the normalized priority hereunder).

(3) A priority comparison process is performed whereby the normalized priorities obtained by the priority translation process from each operating system are compared so that the operating system to be run preferentially is determined and switched to.

According to the invention outlined above, the priority notification process is implemented within each operating system. Every time an operating system switches tasks, notification of the priority of the current task is provided by the process.

A task switching function constitutes a core of an operating system. For that reason, it is often difficult to incorporate priority notifying means in commercially available operating systems. Still, the operating system generally has management information about an ongoing task held in computer memory, and part of the management information includes task execution priorities. In order to enhance the speed of task switching, the operating system may store the priority of the currently executing task in a specific variable (stored priority variable). Taking advantage of these features, the priority monitoring process retrieves the task management information or stored priority variable to verify the priority of the task being carried out by each operating system. The priority monitoring process verifies task priorities by use of such timings as external interrupts and timer interruptions.

The priority translation process involves translating the priority of the currently executing task obtained from each operating system into a normalized priority common to the operating systems involved within the computer. In implementing its function, the priority translation process may have a priority translation table corresponding to each operating system. The priority translation table is a correspondence table allowing normalized priorities to be determined based on the task priorities specific to each operating system. Although it is possible to translate task priorities of individual operating systems into normalized priorities using simple numerical formulas, priority translation tables should preferably be used to switch the operating systems in a rapid and flexible fashion. For example, normalized priority values to be set into the priority translation tables may be defined in such a manner that the normalized priorities from the individual operating systems will not become identical to one another.

The priority comparison process involves acquiring from the priority translation process the normalized priority of currently executing task priority of each operating system to see if any other operating system has a higher normalized priority than the currently executing operating system. If an operating system with a higher normalized priority is detected, that operating system is selected to replace the current operating system.

Other objects, features and advantages of the invention will become more apparent upon a reading of the following description and appended drawings.

DESCRIPTION OF THE PREFERRED EMBODIMENTS

Preferred embodiments of this invention will now be described with reference to the accompanying drawings.

Figure 1:
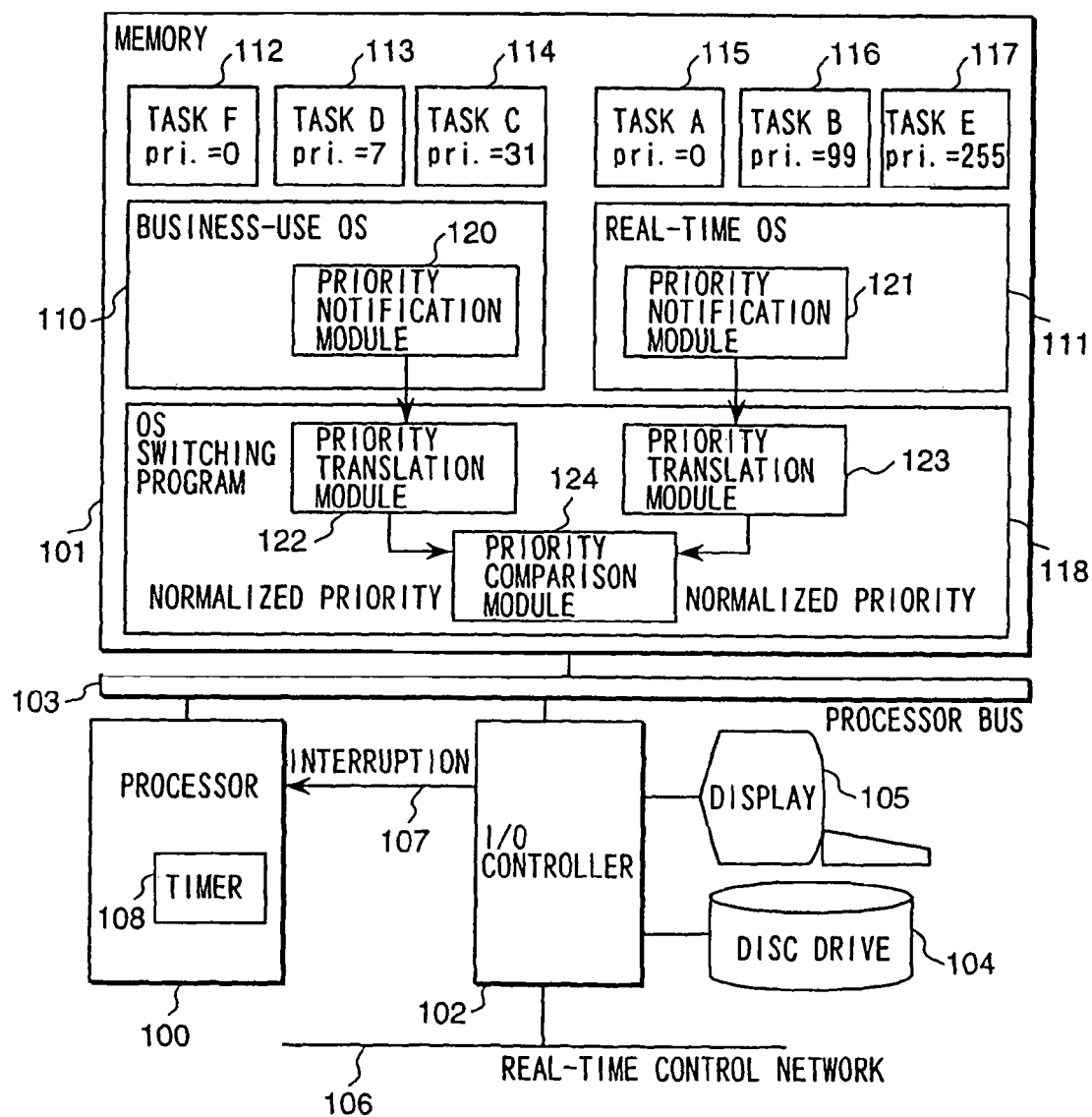
FIG. 1 is a block diagram showing a typical system constitution of a computer practiced as a first embodiment of this invention.

FIG. 1 shows an overall constitution of a computer practiced as the first embodiment of this invention. The computer generally comprises a processor 100, a memory 101, an I/O controller 102, a disc drive 104, and a display 105. The processor 100, memory 101 and I/O controller 102 are interconnected by a processor bus 103. The processor 100 is implemented as a microprocessor that runs a plurality of operating systems. The memory 101 stores a business-use operating system (OS) 110, a real-time OS 111, tasks 112 through 117 performed by the operating systems, and an operating system switching program 118. These programs are read out and executed by the processor 100.

The I/O controller 102 is connected to the disc drive 104 that stores programs and data, as well as to the display 105 that provides screen displays. Where a computer for factory and plant control purposes or for built-in uses is to be implemented, the I/O controller 102 may be connected to a real-time control network 106. The real-time control network 106 is linked to such I/O devices as sensors and actuators. Any or all of the disc drive 104, display 105, and real-time control network 106 may be omitted depending on the system configuration. The I/O controller 102 is connected to the processor 100 through an interrupt signal line 107 and notifies the processor 100 of the completion of an I/O operation and other events. Although FIG. 1 shows the interrupt signal line 107 to be independent of the processor bus 103 for purpose of illustration, the signal line 107 is in fact an integral part of the bus 103. The processor 100 incorporates a timer 108 that generates an internal interruption at constant intervals. Interruptions from the timer 108 are used for time management by the operating systems.

The processor 100 is capable of masking external interruptions sent over the interrupt signal line 107 or internal interruptions from the timer 108. Interrupt masking is a function for delaying specific interruptions until the function is canceled by a program. Generally, three types of interrupt masking exist:

(1) all-interrupt masking: all interruptions are masked.

(2) individual interrupt masking: interruptions are masked individually.

(3) interrupt level masking: levels are set for individual interruptions so as to mask interruptions below a specified level.

In many cases, either the function types (1) and (2) or the function types (1) and (3) above are combined to implement the interrupt mask function. Which combination to adopt depends on the type of the processor 100. If the processor 100 adopts the combination of the types (1) and (3), interrupt levels are determined in accordance with the importance of each I/O device handling interruptions. Illustratively, interruptions from the real-time control network 106 are set to be higher in priority than those from the disc drive 104 or display 105.

In the first embodiment, two operating systems, i.e., business-use OS 110 and real-time OS 111, reside in the computer. These operating systems utilize memory and processor resources assigned thereto in executing the tasks 112 through 114 as well as the tasks 115 through 117. It is assumed that the first embodiment comprises two operating systems and six tasks (three to each OS). However, this is not limitative of the invention, and more or fewer operating systems and/or tasks may be provided to practice the invention. Whereas the first embodiment does not presuppose dynamic changing of the number of operating systems, it is possible for the first embodiment to let each operating system generate or delete tasks in a dynamic fashion. Although the description that follows will cover the business-use OS 110 and real-time OS 111, the techniques to be described below also apply to any other types of operating systems. The tasks 112 through 114 are business-use tasks performed by the business-use OS, while the tasks 115 through 117 are real-time tasks carried out by the real-time OS. The tasks are defined in terms of priorities independently under each of the business-use OS 110 and real-time OS 111.

In the first embodiment of FIG. 1, the tasks 112 through 114 have priorities 0, 7 and 31 respectively under the business-use OS 110; and the tasks 115 through 117 have priorities 0, 99 and 255 respectively under the real-time OS 111. For the first embodiment, it is assumed that a task generically refers to a process or a thread. A process signifies a program that runs while occupying an individual memory space. Thus a given process cannot generally alter data of another program. A thread refers to a program that runs while sharing a common memory space of a process. That is, no data protection function exists between threads that operate within the same process.

The operating systems incorporate priority notification modules 120 and 121. The priority notification module 120 or 121 is executed upon task switchover of each operating system, notifying the operating system switching program 118 of the priority of the next task to be carried out.

In many cases, the business-use OS has a priority scheme different from that of the real-time OS. The real-time OS generally has a relatively large number of priority levels to provide quick response to important interruptions. The business-use OS, on the other hand, adopts a relatively small number of priority levels to enhance throughput. For some operating systems, the smaller the priority value (i.e., close to 0), the higher the priority; for other operating systems, the larger the priority value, the higher the priority. It follows that simply comparing priorities obtained illustratively by the priority notification modules 120 and 121 of the different operating systems often has little significance. For purpose of explanation, it is assumed that the larger the priority value, the higher the task priority for the business-use OS. 110 (task 114 has the highest priority in FIG. 1) and that the smaller the priority value, the higher the task priority for the real-time OS 111 (task 115 has the highest priority in FIG. 1). Priorities may be designated anywhere between 0 and 31 for the business-use OS 110, and between 0 and 255 for the real-time OS 111.

The difference in priority scheme between the two operating systems is resolved as follows: the operating system switching program 118 has priority translation modules 122 and 123 as well as a priority comparison module 124 as its components. The priority translation modules 122 and 123 translate priorities coming from the business-use OS 110 and real-time OS 111 respectively into normalized priorities that are common throughout the system. Task priorities from the operating systems, not comparable while unmodified, can be compared once they are translated into normalized priorities. Normalized priorities can be identical to those of one of the operating systems involved. In that case, the operating system in question provides priorities that are regarded as normalized priorities. The priority comparison module 124 compares normalized priorities obtained from both operating systems and switches to one of the operating systems that has the higher normalized priority of the two.

Figure 2:
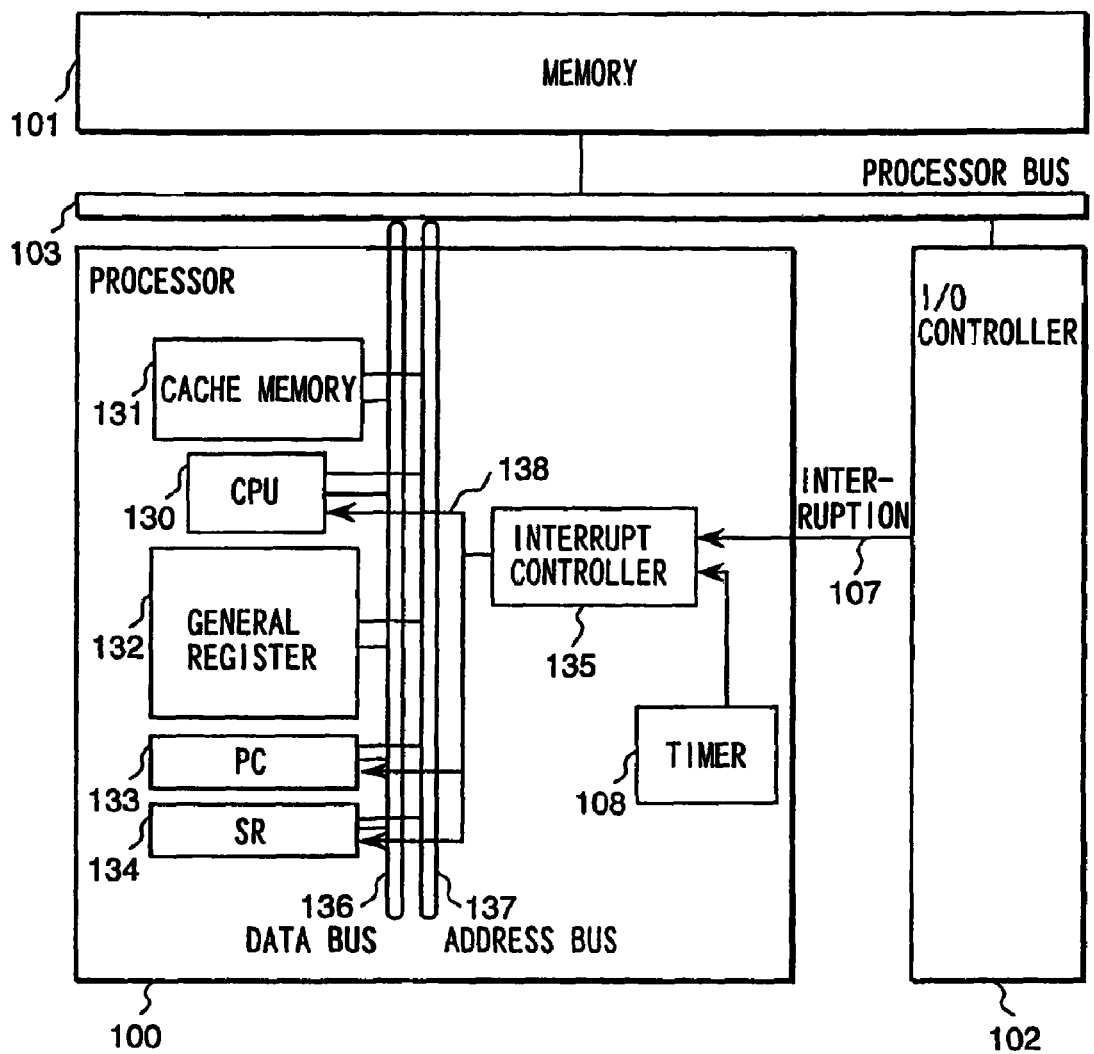
FIG. 2 is a block diagram depicting a hardware structure of the computer.

FIG. 2 outlines an internal structure of the processor 100. A cache memory 131 is a buffer storage that temporarily stores data or instructions from the memory 101. A CPU 130 is an arithmetic circuit that reads instructions from the memory 101 or from the cache memory 131 and executes them one after another. In carrying out instructions, the CPU 130 uses a general register 132 that retains computed results temporarily, a program counter 133 that designates an instruction address, and a status register 134 that retains execution status. The CPU 130, cache memory 131, general register 132, program counter 133, and status register 134 are interconnected by a data bus 136 and an address bus 137. The data bus 136 is made up of a plurality of signal lines for transferring data. The address bus 137 is constituted by a plurality of signal lines for designating addresses.

The interrupt signal line 107 and timer 108 are connected to an interrupt controller 135. The interrupt controller 135 generates an interrupt status signal 138 indicating what kind of interruption is currently generated to the processor 100. Generally, the status register 134 has information about the current interrupt mask and determines whether or not to accept the interruption designated by the interrupt status signal 138. If the interruption is accepted, the interrupt controller 135 updates the program counter 133 and status register 134, and makes corresponding interrupt handler executed.

Figure 3:
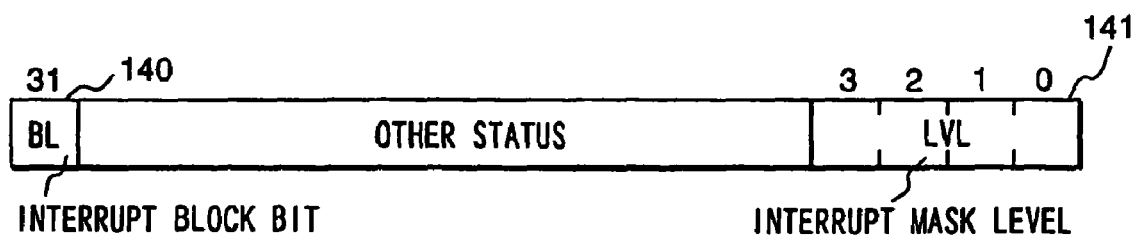
FIG. 3 is a schematic view of a status register for use when an interrupt level mask function is provided.

FIG. 3 shows a structure of the status register 134 for use when the processor 100 is provided with the all-interrupt masking function and interrupt level masking function. In FIG. 3, the status register 134 comprises an interrupt block bit 140 and an interrupt mask level field 141. If the interrupt block bit 140 is turned on, all interruptions to the processor 100 are masked. The interrupt mask level field 141 denotes a current interrupt mask level value; interruptions below the denoted level are rejected. In FIG. 3, the interrupt mask level field 141 is four bits long so that up to a total of 16 mask levels may be designated thereby. (In practice, 15 mask levels are specifiable because interrupt level 0 signifies that interrupt masking is suppressed.) Changing the bit count in the interrupt mask level field 141 allows the number of acceptable interrupt levels to be varied.

Figure 4:
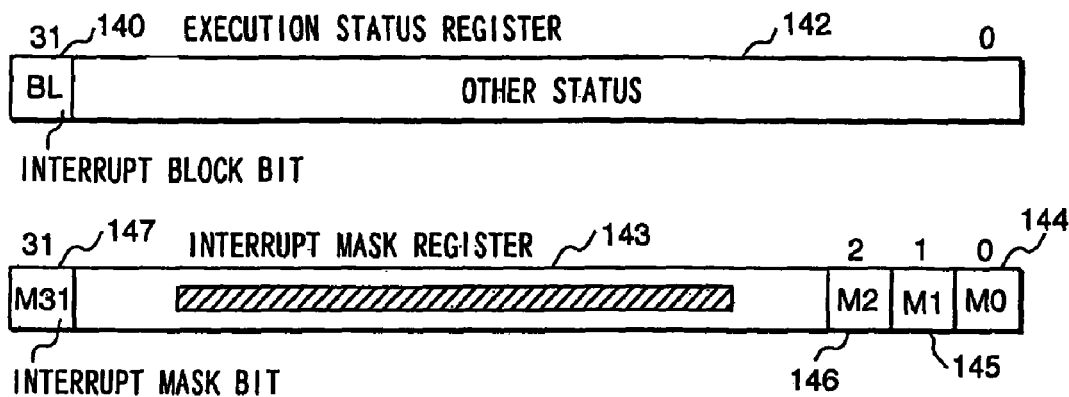
FIG. 4 is a schematic view of a status register for use when an individual interrupt mask function is provided.

FIG. 4 depicts a structure of the status register 134 for use when the processor 100 has the all-interrupt masking function and individual interrupt masking function. In this example, the status register 134 is actually composed of two registers (i.e., execution status register 142 and interrupt mask register 143). As in the makeup of FIG. 3, the execution status register 142 contains an interrupt block bit 140. Interrupt mask bits 144 through 147 in the interrupt mask register 143 correspond to different kinds of interruptions. When any one of the interrupt mask bits is turned on, the corresponding kind of interruption is not accepted. The status register of FIG. 3 is a specialized variation of the status register shown in FIG. 4. Illustratively, the state in which the interrupt mask bit 144 alone is turned on may be equated with level 1; the status in which the interrupt mask bits 144 and 145 are turned on, with level 2; the status where the interrupt mask bits 144 through 146 turned on, with level 3; and so on. Thus in the description that follows, the status register 134 is assumed to have the structure illustrated in FIG. 4.

Generally, when the processor accepts an interruption, the interrupt block bit 140 is automatically turned on by hardware and the address of the interrupt handler is set to the program counter 133. The interrupt block bit 140 may be turned off as needed by the interrupt handler to permit servicing of the interruption. It is also possible for an operating system or a task to update temporarily the contents of the interrupt block bit 140 or of the interrupt mask register 143 in order to make the servicing of a specific interruption waited. The interrupt masking function is used to effect exclusive control and to prevent generation of the same interruption during interrupt handling.

Figure 5:
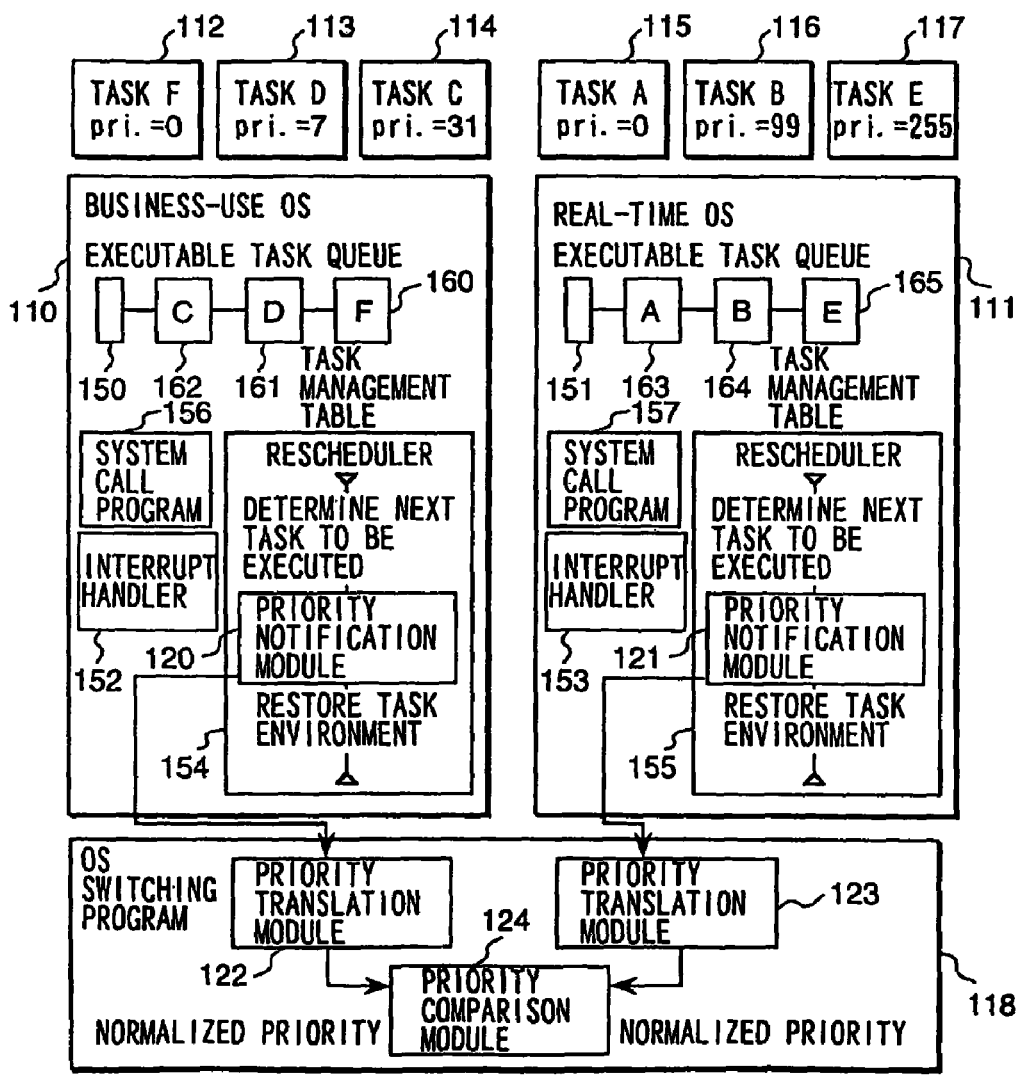
FIG. 5 is a block diagram showing detailed internal structures of operating systems.

FIG. 5 depicts internal structures of the business-use OS 110 and real-time OS 111. In FIG. 5, all components of the operating systems are shown held in the memory 100.

Both the business-use OS 110 and the real-time OS 111 manage executable task information in the form of queues 150 and 151. Although executable task queues 150 and 151 may be set up for each priority, the first embodiment gets each operating system to manage all executable tasks in a single queue. The technical contents of this invention are not affected by whether each OS has a single executable task queue or by whether each priority is matched with a queue. Each task takes three states successively: (a) an execution state, (b) an executable state, and (c) a wait state. For these reasons, each operating system supplements the executable task queue with other queues for managing such tasks as wait state tasks and stopped state tasks. The additional queues are omitted in FIG. 5. Task management tables 160 through 165, controlled by the executable task queues 150 and 151, retain priorities of tasks to be executed as well as values of the program counter, status register and general register in effect upon task execution.

Where executable tasks are managed by use of a single queue, the task management tables registered to the queue are arranged in descending order of their priorities. That is, the management table of the next task to be executed is at the head of the queue. As described above, the business-use OS 110 has priorities 0 through 31; the larger the priority value, the higher the priority under this operating system. The real-time OS 111 has priorities 0 through 255; the smaller the priority value, the higher the priority under this OS. Thus under the business-use OS 110, a task management table 162 corresponding to a task 114 (with priority value 31) comes at the head of the executable task queue 150, followed by a task management table 161 of a task 113 (with priority value 7) and a task management table 160 of a task 112 (with priority value 0). Conversely, under the real-time OS 111, a task management table 163 corresponding to a task 115 (with priority value 0) comes at the head of the executable task queue 151, followed by a task management table 164 of a task 116 (with priority value 99) and a task management table 165 of a task 117 (with priority value 255).

The operating systems also have interrupt handlers 152 and 153 for performing interrupt handling, system call programs 156 and 157 for offering services to tasks, and reschedulers 154 and 155 for switching tasks. The reschedulers 154 and 155 are started when tasks must be switched upon generation, deletion, stop or resumption of a task or in the case of an external or internal interrupt. The execution environment (e.g., register values) of the preceding task are placed into the corresponding task management table before the rescheduler 154 or 155 is called. When the next task to be executed is determined, the execution environment relevant to the task in question is retrieved from the corresponding task management table. The retrieved values are set to the program counter, status register and general register so that the selected task is carried out.

The reschedulers 154 and 155 have the priority notification modules 120 and 121 inside. The priority notification modules 120 and 121 are started immediately before the execution environment of the new task to be performed is set to the registers. When thus started, the priority notification module 120 or 121 notifies the priority translation module 122 or 123 in the operating system switching program 118 of the priority of the task in question.

Figure 6:
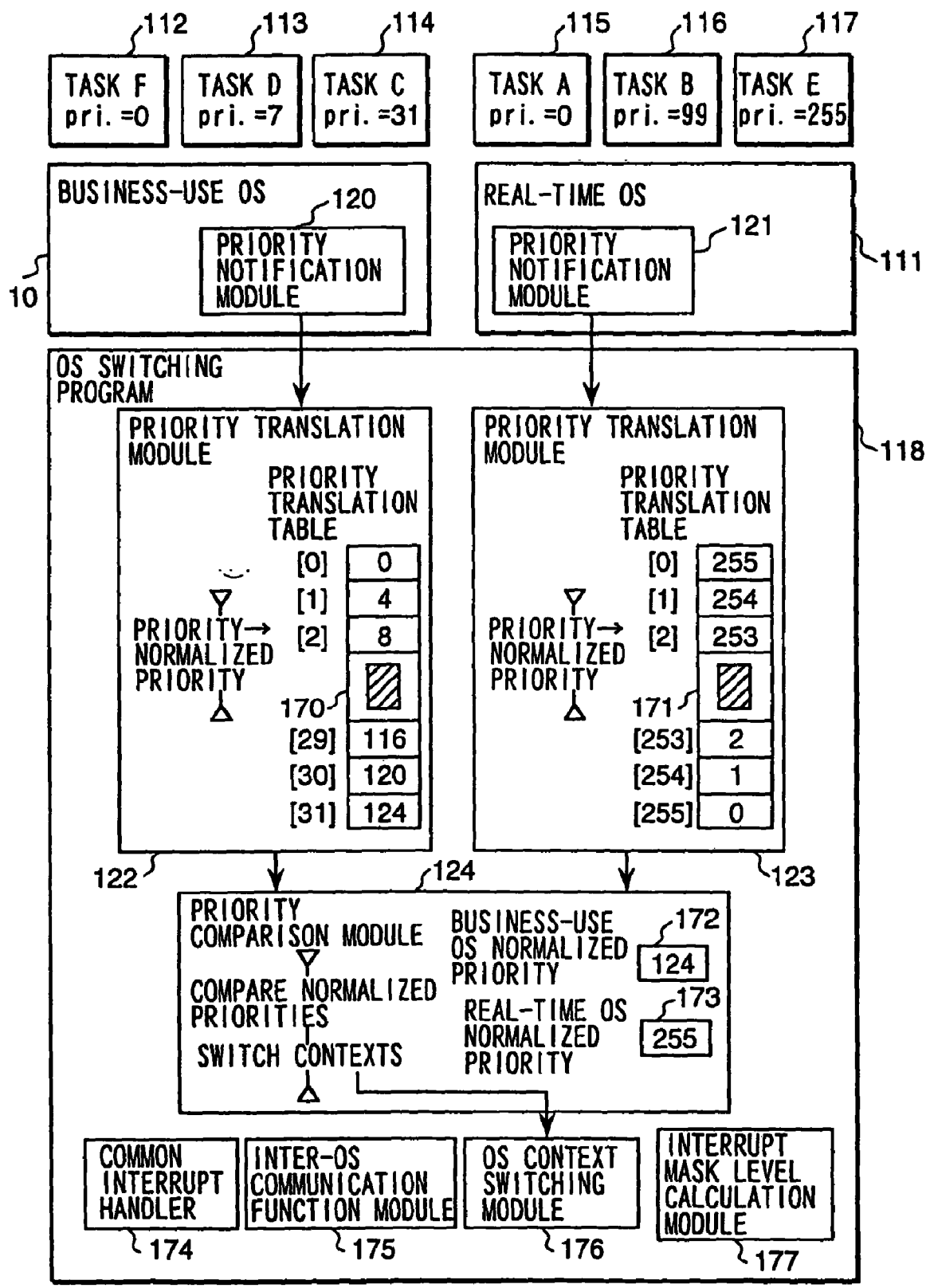
FIG. 6 is a first block diagram depicting a detailed internal structure of an operating system switching program.

FIG. 6 shows an internal structure of the operating system switching program 118. The priority translation modules 122 and 123 have priority translation tables 170 and 171 for translating task priorities under the different operating systems into normalized priorities. With the first embodiment, normalized priorities are integers ranging from 0 to 255. For this embodiment, it is assumed that the larger the normalized priority value, the higher the normalized priority. Naturally, it is also possible to alter the range of normalized priorities or to define that the smaller the normalized priority value, the higher the normalized priority.

As stated earlier, the business-use OS 110 has priorities 0 through 31. In that case, the priority translation table 170 has an array of 32 entries. Each array element has an integer that falls anywhere between 0 and 255 and satisfies the following inequality (the array is named "prioBusiness"):

$$i > j \Leftrightarrow prioBusiness[i] > prioBusiness[j]$$

where, $0 \leq i$ and $j \leq 31$.

The inequality above must be satisfied because the larger the priority value, the higher the priority in the case of priorities under the business-use OS 110 as well as for normalized priorities.

Likewise, where the real-time OS 111 has priorities ranging from 0 to 255, the priority translation table 171 has an array of 256 entries. Each array element has an integer that falls anywhere between 0 and 255 and satisfies the following inequality (the array is named "prioRealtime"):

$$i > j \Leftrightarrow prioRealtime[i] < prioRealtime[j]$$

where, $0 \leq i$ and $j \leq 255$.

The reason for having in the above inequality a less-than sign as opposed to a greater-than sign for the business-use OS is that the smaller the priority value, the higher the priority under the real-time OS.

In FIG. 6, if the task 114 is judged to be executable next under the business-use OS 110, the priority notification module 120 notifies the priority translation module 122 of the priority value of 31. Using the priority translation table 170, the priority translation module 122 then acquires a normalized priority value of 124. If the task 115 is judged to be executable under the real-time OS 111, the priority notification module 121 notifies the priority translation module 123 of the real-time OS priority value of 0. By use of the priority translation table 171, the priority translation module 123 then obtains a normalized priority value of 255. It should be noted that for the first embodiment, the normalized priority value from the business-use OS 110 never exceeds 124 no matter how high the task priority is under that OS. This is an extreme example of establishing priority translation tables in such a manner that real-time OS tasks are executed preferentially as much as possible. (A business-use OS task may take precedence over a real-time OS task if the latter has a lower priority.) Obviously, the priority translation table 170 may alternatively be modified in structure in such a manner that task priorities from the two operating systems are translated into normalized priorities on an equal basis as much as possible.

Normalized priorities translated by the priority translation modules 122 and 123 are sent to the priority comparison module 124. The priority comparison module 124 holds a business-use OS normalized priority 172 and a real-time OS normalized priority 173. In this case, the normalized priorities 172 and 173 take the values of 124 and 255 respectively.

As described above, the priority notification modules 120 and 121 reside in the reschedulers and are each executed upon task switchover. Because only one task is performed between one task switchover and the next, the normalized priority under the operating system in question remains unchanged unless dynamic changing of task priorities is implemented. The priority notification modules 120 and 121 always provide notification of priorities upon task switchover. For that reason, the business-use OS normalized priority 172 and real-time OS normalized priority 173 held within the priority comparison module 124 reflect the actual task priorities under the respective operating systems.

The priority comparison module 124 compares the normalized priorities 172 and 173 from the two operating systems and allows one of the operating systems which has the higher priority to be executed preferentially. In the example of FIG. 6, the real-time OS 111 has the higher priority than the business-use OS 110 and is thus executed in preference to the latter.

In addition to the priority translation modules 122 and 123 and the priority comparison module 124, the operating system switching program 118 includes a common interrupt handler 174 that apportions generated interruptions to the appropriate operating systems, an inter-OS communication function module 175 that ensures coordination of processing between the operating systems, an OS context switching module 176 that switches the execution environments of the two operating systems, and an interrupt mask level calculation module 177 that changes interrupt masks depending on the task priority. These programs will be described later in more detail.

Figure 7:
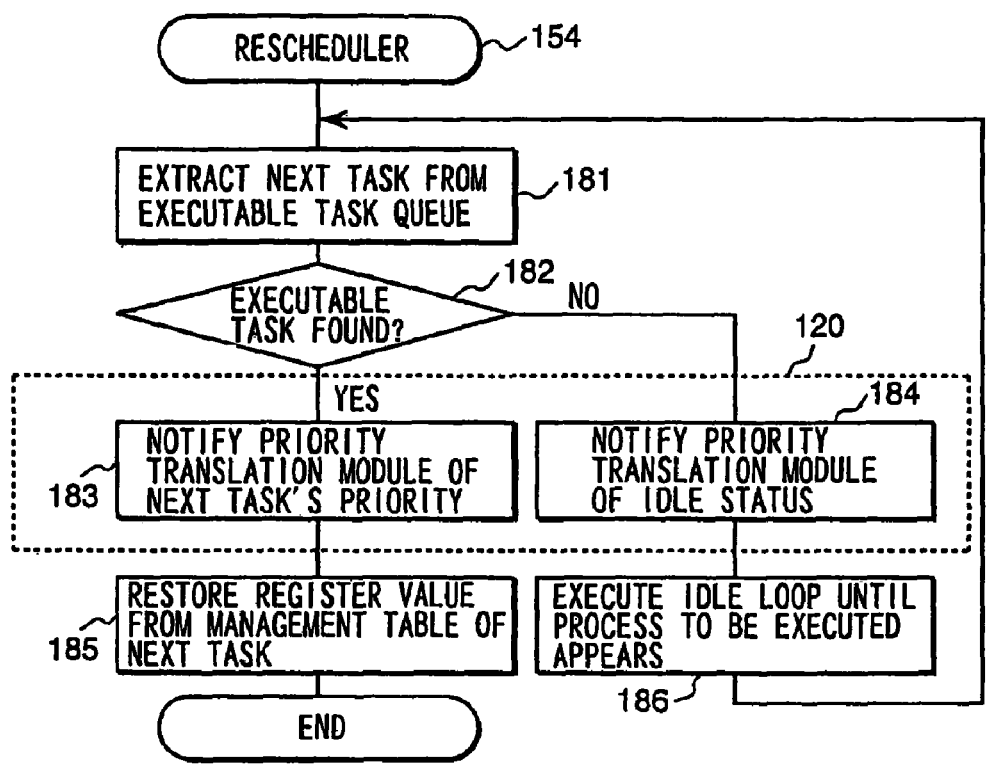
FIG. 7 is a flowchart of steps constituting a process flow of a rescheduler.

FIG. 7 is a flowchart of steps constituting a process flow of the rescheduler 154 under the business-use OS 110. The rescheduler 155 of the real-time OS 111 is also constituted by like steps. The rescheduler 154 is a module that is generally started after the register contents of the currently executing task are saved into the task management table when the current task has become no longer executable or when a task of a higher priority than that of the currently executing task has become executable, in any one of the following cases:

(1) handling of a timer interruption has ended;

(2) handling of an external interruption has ended; or (3) a system call is executed.

System calls that can trigger activation of the rescheduler 154 include:

(a) generation, termination, halt, or resumption of a task (e.g., when a task with a higher priority than the current task is generated);

(b) execution or termination of exclusive control (e.g., when a task becomes a wait state upon an exclusive control.); and (c) changing of a task priority (e.g., when the priority of the current task is reduced).

The rescheduler 154 initially extracts the task management table of the highest priority from the executable task queue 150 (in step 181). At this point, an executable task may not exist, with all tasks in a wait state or stopped. Whether or not an executable task exists is judged in step 182.

If there is no executable task, the rescheduler 154 notifies the priority translation module 122 of an idle state (in step 184). Because an executable task is absent, the idle loop is entered here (in step 186). The idle loop is a program that does nothing until a task to be performed appears. It should be noted here that the priority translation module 122 is notified of the idle state in step 184. If the business-use OS 110 is in an idle state, the priority comparison module 124 executes the real-time OS 111 in preference to the other OS. Thus unless both operating systems enter an idle state simultaneously, the idle loop is not actually performed in step 186. When the business-use OS 110 is again executed, the idle loop is immediately left and step 181 is reached because there is a task to be performed.

If an executable task is judged to exist in step 182, the priority of the task to be performed next is extracted from the task management table and reported to the priority translation module 122. If the reported priority is judged to be lower than the priority of the real-time OS 111 (by comparison of normalized priorities), then the real-time OS 111 is selected at that point. When the real-time OS 111 has higher Normalized priority than business-use OS 110, task execution is restarted immediately after step 183 unless the task to be performed becomes no longer executable because of an interruption or unless a task of a higher priority has become executable (i.e., the task selected in step 181 is started). Naturally, if the currently executing task becomes no longer executable or if a task of a higher priority than the current task becomes executable, the rescheduler 154 is restarted. In step 185, the register contents are restored from the task management table and set to the registers of the processor 100, whereby the selected task is carried out.

In the rescheduler 154, steps 183 and 184 constitute processes done by the priority notification module 120. The priority notification module 121 is embedded likewise in the rescheduler 155.

Figure 8:
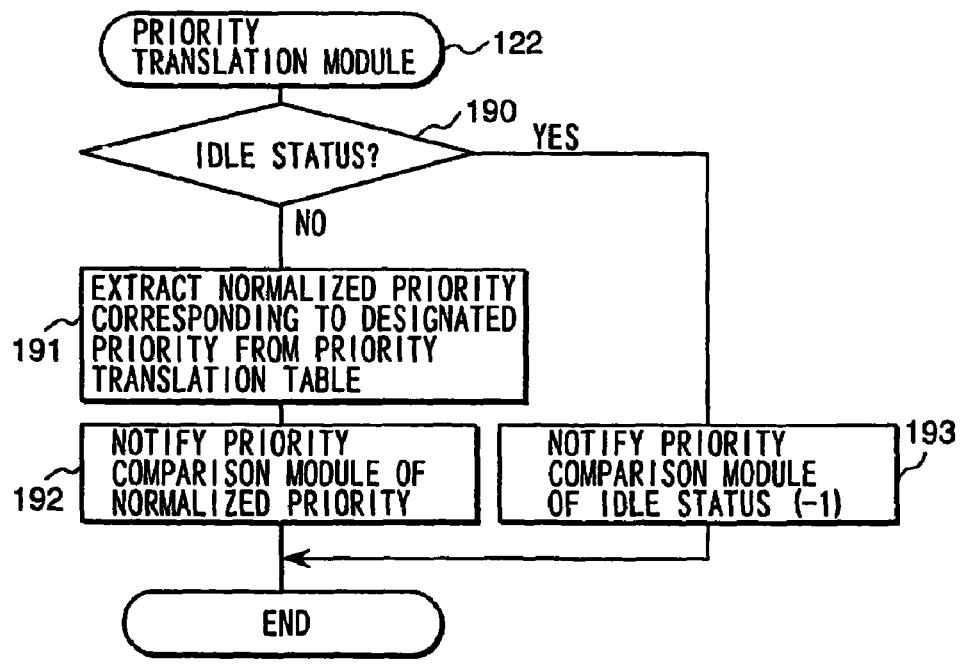
FIG. 8 is a flowchart of steps constituting a process flow of a priority translation module.

FIG. 8 is a flowchart of steps constituting a process flow of the priority translation module 122 corresponding to the business-use OS 110. When called by the priority notification module 120, the priority translation module 122 immediately performs priority translation. First, the priority translation module 122 checks to see if the priority notification module 120 has reported an idle state (in step 190). The idle state may be regarded as a task with a priority lower than any other priority. In this example, the idle state is assumed to have a normalized priority value of −1 so that its priority is lower than any other normalized priority. In step 193, the value of −1 is sent to the priority comparison module 124. If an idle state is not in effect, the corresponding entry is retrieved from the priority translation table 170 (in step 191) and sent to the priority comparison module 124 (in step 192). The same process flow applies to the priority translation module 123 corresponding to the real-time OS 111.

Figure 9:
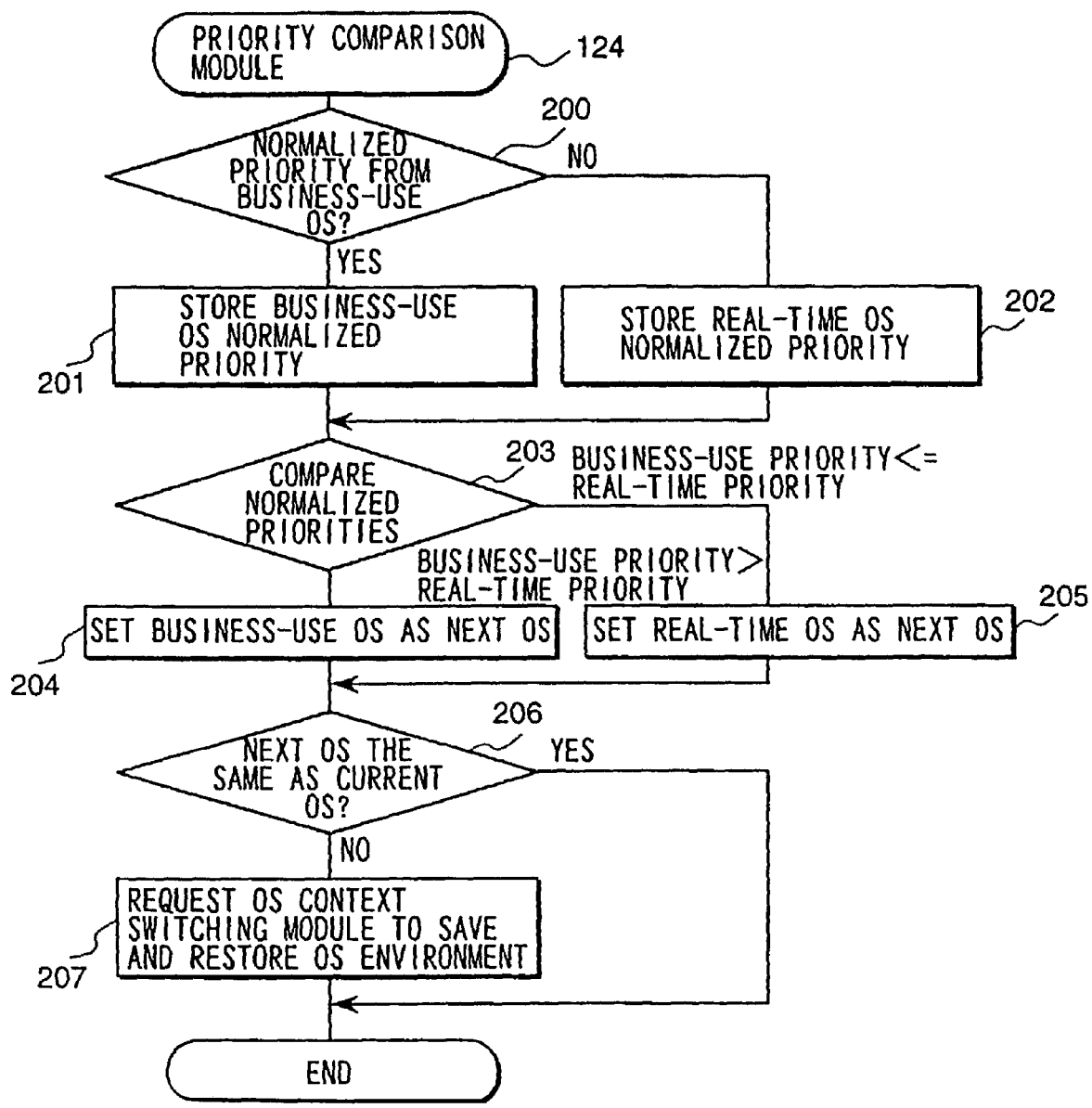
FIG. 9 is a flowchart of steps constituting a process flow of a priority comparison module.

FIG. 9 is a flowchart of steps constituting a process flow of the priority comparison module 124. First, the priority comparison module 124 checks to see if the received priority is a normalized priority coming from the business-use OS 110 or a normalized priority from the real-time OS 111 (in step 200). If the received priority is judged to be a normalized priority of the business-use OS 110, the priority comparison module 124 stores the acquired priority into a location of a business-use OS normalized priority 172 (in step 201). If the received priority is found to be a normalized priority of the real-time OS 111, the priority comparison module 124 stores the obtained priority into a location of a real-time OS normalized priority 173 (in step 202).

A normalized priority is reported only if there is a possibility that the normalized priority of either operating system may have been altered. In such a case, a comparison is made in value between the business-use OS normalized priority 172 and the real-time OS normalized priority 173 (in step 203). With the first embodiment, an operating system having a larger normalized priority value than the other operating system is started preferentially. Thus if the normalized priority value of the business-use OS 110 is greater than the normalized priority value of the real-time OS 111, the business-use OS 110 is selected as the operating system to be executed next (in step 204). Otherwise the real-time OS 111 is performed next (in step 205). With the first embodiment, if the business-use OS 110 has the same normalized priority as the real-time OS 111, the real-time OS 111 is executed preferentially. Alternatively, arrangements may be made to let the business-use OS 110 run in preference to the real-time OS 111 if they have the same normalized priority. One way to simplify the system structure is by making arrangements such that normalized priorities from both operating systems will not become identical in setting up contents of the priority translation tables 170 and 171.

In step 206, a check is made to see if the operating system to be executed next is the same as the currently executing operating system. If the different operating system is to be executed next, the OS context switching module 176 is requested to save and restore the execution environments of the operating systems (in step 207).

Figure 10:
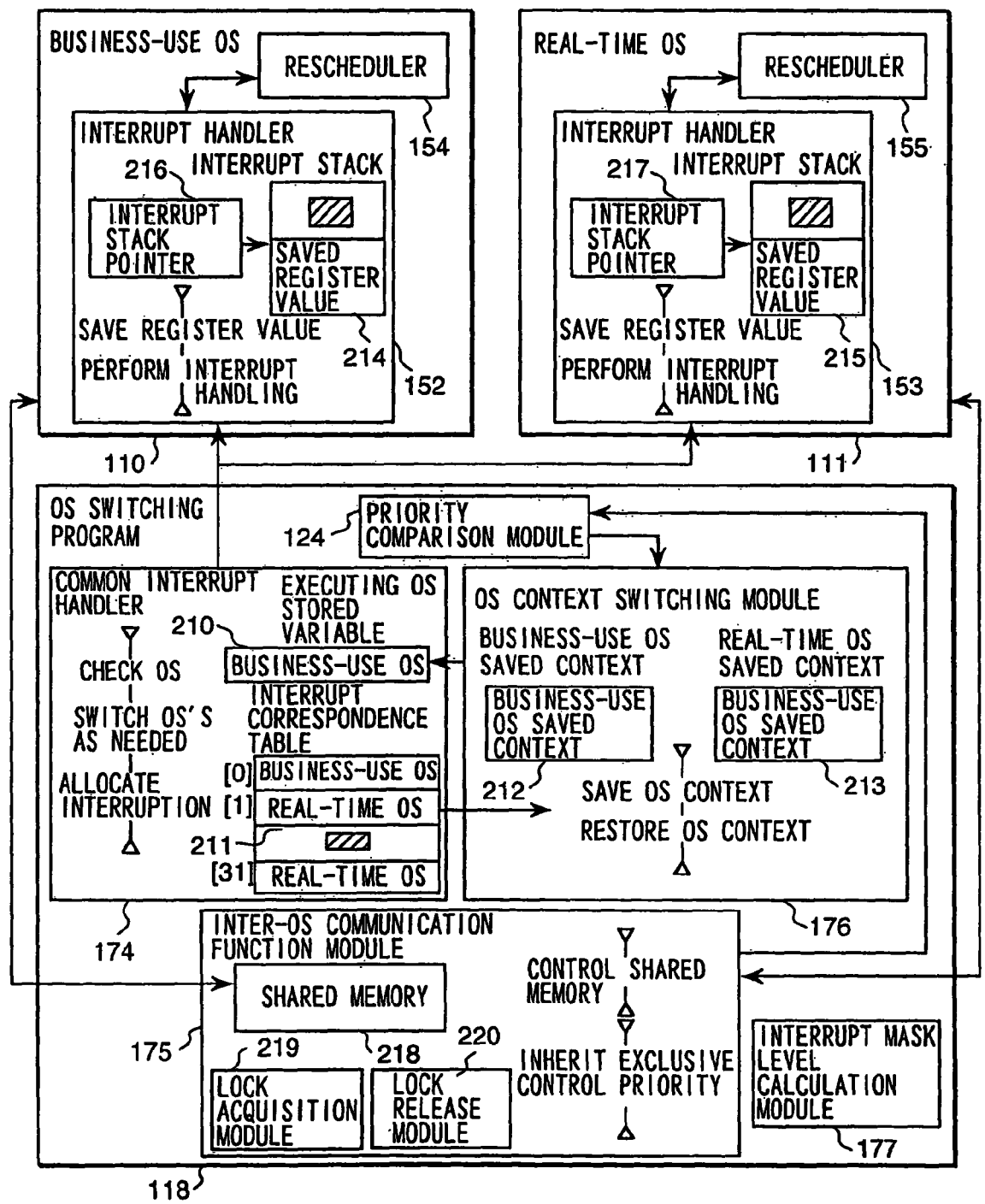
FIG. 10 is a second block diagram illustrating a detailed internal structure of the operating system switching program.

FIG. 10 shows detailed structures of the interrupt handlers 152 and 153, common interrupt handler 174, inter-OS communication function module 175, and OS context switching module 176 (the interrupt mask level calculation module 177 will be discussed in detail with reference to another figure).

The interrupt handler 152 and 153 have interrupt stacks 214 and 215 as regions in which to save or temporarily retain variables such as register values in effect upon interruption. The register contents in effect immediately before an interruption must be saved, and must be restored after the interruption has been handled. The saving and the restoring of register values require the use of the interrupt stacks 214 and 215. A certain type of processor 100 is capable of automatically switching register contents upon interruption and of restoring the initial register values after the interruption in question has been handled. In a computer permitting multiple interruptions, however, the use of such hardware still requires furnishing interrupt stacks (i.e., if an interruption with a higher priority than the current one occurs during interrupt handling, the newly generated interruption needs to be serviced preferentially before handling of the initial interruption is resumed).

The interrupt handlers 152 and 153 further possess interrupt stack pointers 216 and 217 pointing to the extent to which the respective interrupt stacks 214 and 215 have been used. The interrupt handlers 152 and 153 save the execution environment (e.g., register contents) in effect before an interruption and perform what is needed to handle the interruption using the interrupt stacks and interrupt stack pointers. At the end of the interrupt handling, the interrupt handlers 152 and 153 restore the execution environment in effect before the execution in order to resume execution of the interrupted program.

The common interrupt handler 174 apportions interruptions that may occur between the interrupt handlers 152 and 153. The common interrupt handler 174 has a region that stores an executing OS stored variable 210 indicating whether the currently executing operating system is the business-use OS 110 or the real-time OS 111. Illustratively, if it is assumed that the business-use OS 110 is currently running in the setup of FIG. 10, the executing OS stored variable 210 contains data denoting "business-use OS." Obviously, storing a character string "business-use OS" in the executing OS stored variable 210 would be too inefficient. Instead, an integer storage scheme may be adopted illustratively to represent the business-use OS by "0" and the real-time OS by "1." The common interrupt handler 174 further includes an interrupt correspondence table 211 that indicates which operating system a given interruption corresponds to. That is, the interruption correspondence table 211 shows which operating system should handle any given individual interruption. As depicted in FIG. 4, there are 32 causes of interruption for the first embodiment. Thus the interrupt correspondence table 211 is constituted by 32 entries (0 through 31). In the example of FIG. 10, each cause of interruption is defined as corresponding to a specific operating system: interrupt cause 0 corresponding to the business-use OS; interrupt cause 1, to the real-time OS; . . . , and interrupt cause 31, to the real-time OS. In order to promote efficiency, the contents of the interrupt correspondence table 211 should be retained likewise under the integer storage scheme as with the executing OS stored variable 210, rather than under a character string storage scheme.

A certain type of computer has any one of its I/O devices shared by two operating systems (e.g., when the business-use OS 110 and real-time OS 111 both output characters and images on a single display). To implement such a system requires dynamic changing of target operating systems for apportioned interruptions. It is for that reason that with the first embodiment, the target operating system is not fixed but determined according to the interrupt correspondence table 211. Dynamic changing of target operating systems is implemented by modifying the contents of the interrupt correspondence table 211 depending on the use status of a given I/O device.

By referring to the executing OS stored variable 210, the common interrupt handler 174 determines which operating system is currently running. If the currently executing operating system is not the same as the target operating system identified from the interrupt correspondence table 211, the common interrupt handler 174 requests the OS context switching module 176 to switch the operating systems. If the currently executing operating system is found to be the same as the target operating system, or if the operating systems have been switched, the interrupt handler of the applicable operating system is requested to proceed with interrupt handling. The executing OS stored variable 210 is also referenced by the OS context switching module 176. As described, the internal structures of the modules within the operating system switching program 118 are not monopolized by individual modules but may be shared as needed between the modules.

The OS context switching module 176 is started when there occurs a need to switch the operating systems as a result of a comparison of priorities or upon generation of an interruption. In switching the two operating systems, the OS context switching module 176 must have regions in which to save the execution environments of the operating systems (i.e., register values). The OS context switching module 176 is provided with a region for a business-use OS saved context 212 in which to save the execution environment of the business-use OS, and with a region for a real-time OS saved context 213 in which to save the execution environment of the real-time OS. The operating systems are switched by the OS context switching module 176 performing the following: save the execution environment into the saved context region for the currently executing operating system, retrieve the execution environment from the saved context region for the other operating system, and set the retrieved environment to the registers of the processor 100.

The inter-OS communication function module 175 is a program that ensures communication and coordination between tasks under the two operating systems. For the first embodiment, the inter-OS communication function module 175 includes a shared memory 218 that may be used by the business-use OS 110 and real-time OS 111. Also included are a lock acquisition module 219 and a lock release module 220 for effecting exclusive control between the operating systems. The shared memory 218 is part of the memory 101 and may be referenced by both operating systems. The memory space other than the shared memory 218 is roughly divided into a business-use OS area, a real-time OS area, and an operating system switching program area which are monopolized respectively by the business-use OS 110, real-time OS 111, and operating system switching program 118. When tasks under the two operating systems use the shared memory 218, exclusive control is generally implemented to ensure data consistency in the shared memory 218. If an application program carries out exclusive control spanning the two operating systems, functions offered by the lock acquisition module 219 and lock release module 220 are utilized.

Attention should be given to what is called a priority inversion phenomenon. This phenomenon generally signifies the situation in which:

(a) a task α of a low priority is first started, acquiring lock on memory;

(b) a task β of a high priority is then started and enters a lock wait state; and (c) a task γ of a medium priority is started, triggering a switchover from the task α (with the low priority) to the task γ (with the medium priority).

In the above situation, execution of the task γ hampers execution of the task α and thereby prolongs the time it takes the high-priority task β to acquire lock. Such a priority inversion phenomenon is generally resolved by resorting to what is known as a priority ceiling scheme or a priority inheriting scheme.

The priority ceiling scheme involves raising the priority of a task that has acquired lock to a predetermined level. This makes the priority of the task α having acquired lock higher than that of the task γ (with the medium priority) on a temporary basis, allowing the task α to be performed continuously until lock is released even if the task γ has been started. Thereafter, the high-priority task β acquires lock and the processing is continued.

The priority inheriting scheme is a variation of the priority ceiling scheme ensuring more flexibility than the original scheme. Under the priority inheriting scheme, if the task having entered a lock wait state (task β in the example above)

has a higher priority than the task having acquired lock (task α), the higher priority is inherited by the lock-acquisition task. The task α inherits the priority of the task β only while lock is being acquired. In cases where exclusive control is effected between tasks of low priorities, it may not be necessary to raise the priority of a task that has acquired lock to a predetermined level. Such cases are dealt with effectively by the priority inheriting scheme.

The lock acquisition module 219 and lock release module 220 of the first embodiment are provided to implement the priority ceiling scheme or priority inheriting scheme between the operating systems. Either of the schemes is implemented by use of normalized priorities between the operating systems.

What follows is a description of process flows of the OS context switching module 176, common interrupt handler 174, interrupt handler 152, lock acquisition module 219, and lock release module 220 shown in FIG. 10. The process flow of the interrupt handler 153 is the same as that of the interrupt handler 152 and thus will be omitted from the ensuing description.

Figure 11:
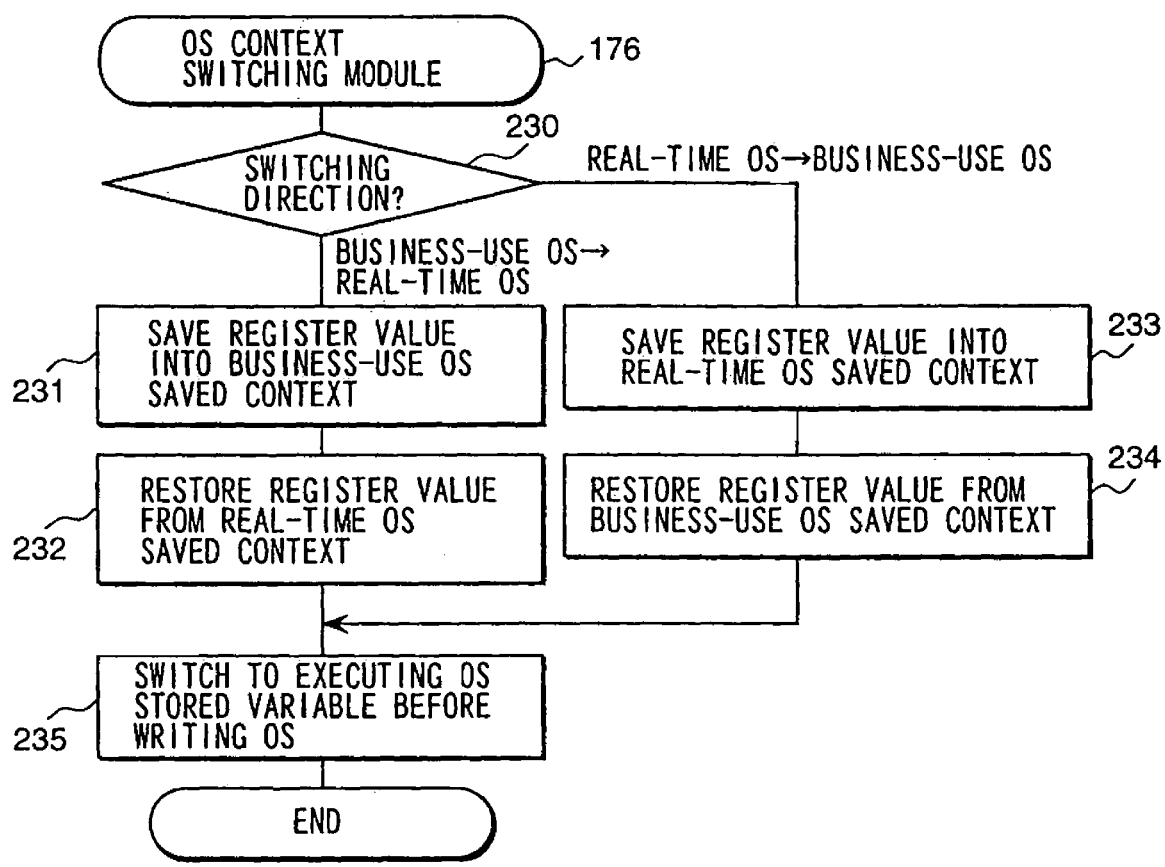
FIG. 11 is a flowchart of steps constituting a process flow of an OS context switching module.

FIG. 11 is a flowchart of steps constituting a process flow of the OS context switching module 176. The OS context switching module 176 is called only when the operating systems need to be switched; a check on the need to effect such a switchover has been completed before the module 176 is called up. First, a check is made to see which operating system needs to be selected (in step 230). If the business-use OS 110 is to be replaced by the real-time OS 111 (i.e., the currently executing operating system is the business-use OS 110 that needs to be taken over by the real-time OS 111 with a higher priority than the other OS), the current values of the registers are saved into the business-use OS saved context 212 (in step 231). The execution environment is then retrieved from the real-time OS saved context 213 and set to the registers (in step 232). This allows the real-time OS 111 to be restarted from the state in which it was most recently halted upon saving of the register contents. Conversely, if the real-time OS 111 is to be replaced by the business-use OS 110, the current values of the registers are saved into the real-time OS saved context 213 (in step 233), and the register values are restored from the business-use OS saved context 212 (in step 234). In any case, the value that shows the executing operating system following the switchover is written to the executing OS stored variable 210 (in step 235).

Figure 12:
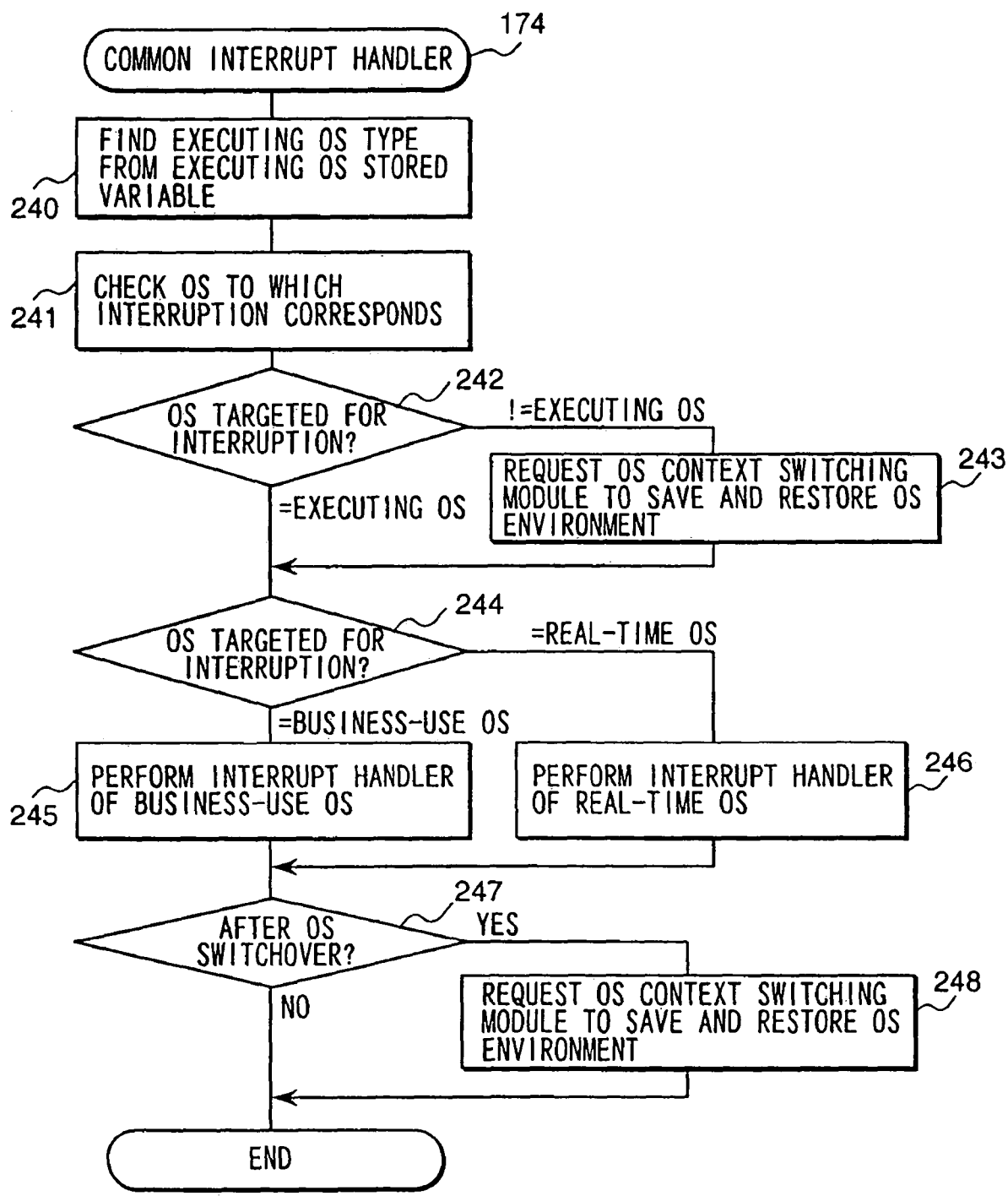
FIG. 12 is a flowchart of steps constituting a process flow of a common interrupt handler.

FIG. 12 is a flowchart of steps constituting a process flow of the common interrupt handler 174. In a computer controlled by a single operating system, all interruptions are generally handled by a module called an interrupt handler before the interruptions are apportioned to individual programs. On the other hand, in a computer such as that of the first embodiment controlled by a plurality of operating systems, individual interrupt handlers are preceded by a common interrupt handler that initially receives all interruptions. The common interrupt handler assigns the accepted interruptions to the interrupt handlers of the corresponding operating systems. When a given interruption is to be apportioned to an operating system, the currently executing operating system may not be the OS to which the interruption in question belongs. In that case, the operating systems need to be switched; the switching is done by the common interrupt handler.

After an interruption is generated, the common interrupt handler 174 first retrieves the contents of the executing OS stored variable 210 and thereby determines whether the currently executing operating system is the business-use OS 110 or the real-time OS 111 (in step 240). The interrupt correspondence table 211 is then used as a basis for determining the operating system to which the generated interruption corresponds (in step 241). For example, where the interrupt correspondence table 211 of FIG. 10 is used, an interruption "0" is judged to correspond to the business-use OS 110; an interruption "1," to the real-time OS 111; ..., and an interruption "31," to the real-time OS 111. Here, a check is made to see if the target operating system for the interruption is the same as the currently executing operating system (in step 242).

If the generated interruption is judged to be irrelevant to the currently executing operating system, the operating systems must be switched. The OS context switching module 176 is requested to carry out the switchover (in step 243). A check is then made to see whether the target operating system for the interruption is the business-use OS 110 or the real-time OS 111 (in step 244). If the target operating system turns out to be the business-use OS 110, the interrupt handler 152 of the business-use OS 110 is started (in step 245). If the generated interruption corresponds to the real-time OS 111, then the interrupt handler 153 of the real-time OS 111 is started (in step 246). Generally, when a task switchover must be performed for interrupt handling, the interrupt handler 152 or 153 calls up the rescheduler 154 or 155 and does not return control to the common interrupt handler 174. If a task switchover is not effected, the processing of the interrupt handler in effect is terminated then and there. At this point, the interrupt handler 152 or 153 returns control to the common interrupt handler 174 (to be described later with reference to FIG. 13). In turn, the common interrupt handler 174 resumes processing from step 247. Step 247 is a step in which to verify whether the operating systems have been switched upon interrupt generation. If the operating systems were switched in step 243, they must be switched again to restore the initial execution environment. The absence of switching of tasks signifies no change in the normalized priorities of the two operating systems. Hence the need for restoring the execution environment in effect before generation of the interruption. Thus the OS context switching module 176 is again requested to carry out the switchover (in step 248).

If the interrupt handler of either of the operating systems has activated its rescheduler 154 or 155, control will not be returned to step 247 of the common interrupt handler 174 as described above. In such a case, the rescheduler 154 or 155 notifies the priority translation module 122 or 123 of a new task priority. The priority comparison module 124 then judges whether or not to switch the operating systems.

Figure 28:
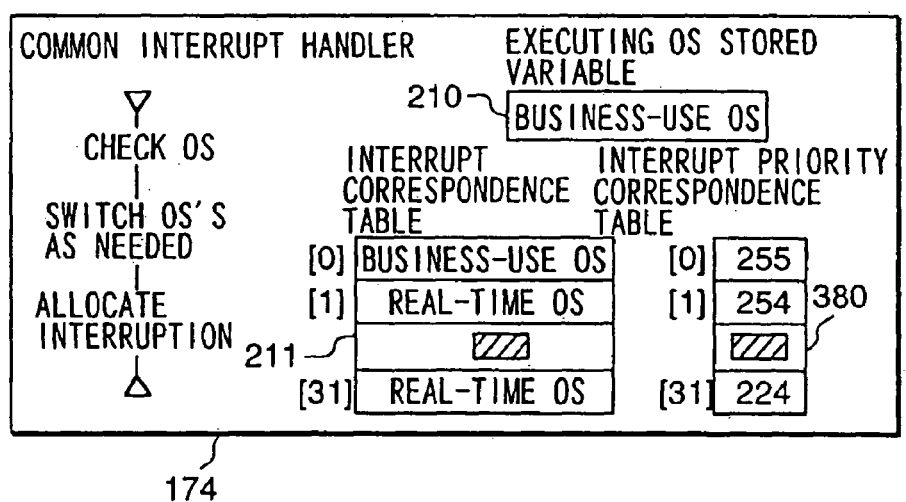
FIG. 28 is a schematic view showing another structure of the common interrupt handler.

The structure of the common interrupt handler 174 may be modified as shown in FIG. 28. The common interrupt handler 174 depicted in FIG. 28 comprises an interrupt priority correspondence table 380 in addition to the components of the common interrupt handler indicated in FIG. 10. The interrupt priority correspondence table 380 designates which interrupt handler should operate at which normalized priority level. In the example of FIG. 28, the interrupt handler corresponding to an interrupt cause 0 must operate at a normalized priority level of 255, whereas the interrupt handler corresponding to an interrupt cause 31 must operate at a normalized priority level of 224. On starting the interrupt handler of a given operating system, the common interrupt handler 174 updates the normalized priority of the operating system in question according to the interrupt priority correspondence table 380. After terminating the interrupt handler, the common interrupt handler 174 restores the initial normalized priority. Although the common interrupt handler 174 is shown possessing the interrupt priority correspondence table 380 in this example, this is not limitative of the invention. Alternatively, the interrupt priority correspondence table 380 may be incorporated in each of the priority translation modules 122 and 123 which are requested by the common interrupt handler 174 to translate priorities.

If normalized priorities can be allocated to interruptions as shown in FIG. 28, then normalized priorities can also be assigned to all operation states of each operating system. Illustratively, an operation system generally has the following four operation states:

(1) idle state
(2) task execution state
(3) self-processing state of the operating system (e.g., initialization)
(4) interrupt handling state Normalized priorities may be allocated to all of the above operation states. In such cases, the interrupt handling state must generally be given the highest normalized priority to become active preferentially. The highest-priority interrupt handling state is followed by the self-processing state of the operating system, the task execution state and the idle state, in that order.

Figure 13:
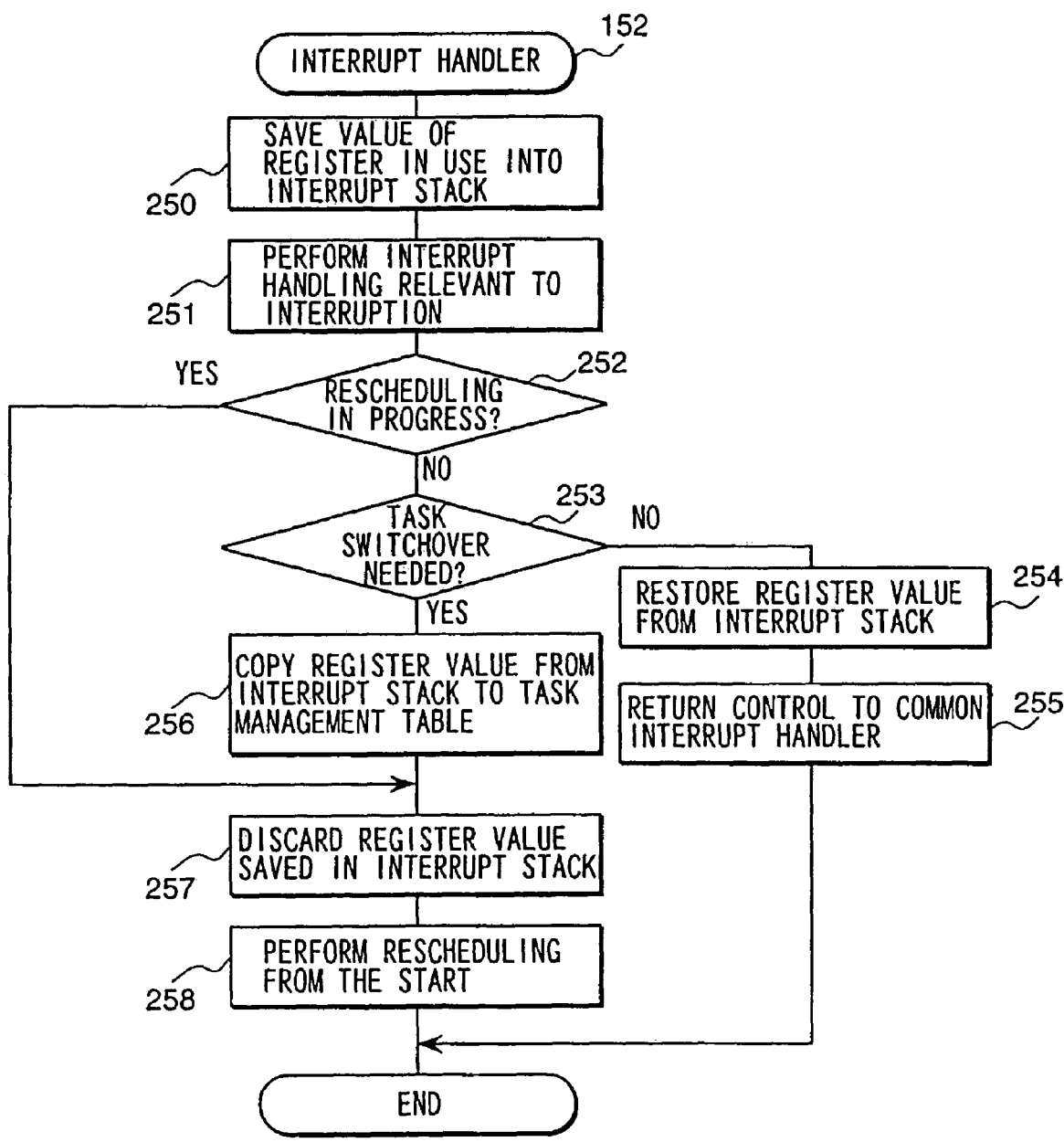
FIG. 13 is a flowchart of steps constituting a process flow of an interrupt handler.

FIG. 13 is a flowchart of steps constituting a process flow of that interrupt handler 152 in the business-use OS which is called up by the common interrupt handler 174. First, the interrupt handler 152 saves the current values of the registers into the interrupt stack 214 (in step 250), and handles the interruption in question (in step 251). A check is made (in step 252) to see if the operating system is in a rescheduling state (i.e., to see whether the rescheduler 154 is being executed). The rescheduling state is a state in which the execution environment of previously executed task is saved on the corresponding task management table and the next task to be performed is being selected so that no task is currently executed. This means that if the processing of the operating system is to be simplified, rescheduling need only be executed from the beginning. That is, if a rescheduling state is detected, the saved register values in the interrupt stack are discarded (in step 257), and the rescheduler 154 is restarted (in step 258). If an interruption is generated during rescheduling, it may not be necessary again to select the next task to be executed. In such a case, with the above method in use, rescheduling is still carried out from the beginning, which is not efficient. Such an inefficiency is averted illustratively by a method of queuing processes which occur during rescheduling and which may affect the execution of the rescheduler 154 (such as task activation and termination). The queued processes are executed altogether before termination of the rescheduler 154 or within the priority notification module 120. With the latter method in use, there is no need to restart partly-executed rescheduling every time an interruption is generated. However, after the queued processes are executed altogether, it is necessary to verify whether or not rescheduling is needed again.

For purpose of simplification, the first embodiment is described as adopting the former of the two methods above. If the latter method is adopted, the following resources should be furnished:

(1) a flag indicating whether rescheduling is being carried out
(2) a queue for accommodating processes In a system call or the other function provided by the operating system, any process that may affect the execution of the rescheduler 154 is placed into the queue if rescheduling is under way. A module for performing the queued processes altogether is inserted into the process flow of the rescheduler 154.

If the interrupt handler 152 judges that rescheduling is not under way, that means the operating system is currently performing some task. In that case, a check is made to see if tasks need to be switched (in step 253). If switching of tasks is judged to be unnecessary (i.e., if the current task has the highest priority and is executable), the execution of the interrupt handler 152 is terminated here. Then the register values saved in the interrupt stack 214 are restored (in step 254) and control is returned to the common interrupt handler (in step 255). If switching of tasks is judged to be necessary, the register values saved in the interrupt stack 214 are copied to the task management table (in step 256), and the saved register values in the interrupt stack are discarded (in step 257). Thereafter the rescheduler 154 is started (in step 258). If the processor 100 is capable of referencing data in the memory 101 while changing the value on the interrupt stack pointer 216 at the same time, then steps 256 and 257 may be carried out collectively.

Process flows of the lock acquisition module 219 and lock release module 220 will now be described. It is assumed that the modules are subject to the priority ceiling scheme; an embodiment relevant to a priority inheriting scheme will be described later. In the description that follows, a task that has requested acquisition or release of lock is called the current task, and the operating system managing that task is called the current operating system as opposed to the other operating system.

Figure 14:
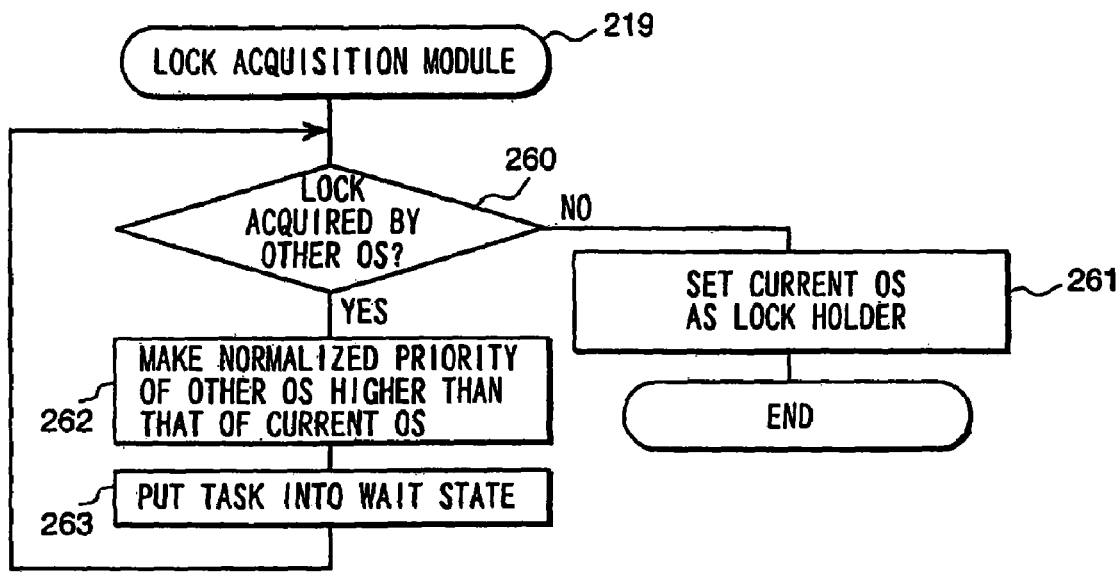
FIG. 14 is a flowchart of steps constituting a process flow of a lock acquisition module under a priority ceiling scheme.

FIG. 14 is a flowchart of steps constituting a process flow of the lock acquisition module 219 under the priority ceiling scheme. The lock acquisition module 219 first checks to see if a task of the other operating system has acquired lock (in step 260). If no task of the other operating system is judged to have acquired lock, the current operating system is set to be the lock holder (in step 261). If any task of the other operating system has acquired lock, then the task of the current operating system is placed in a wait state (in step 263). In that case, the other operating system must be allowed to run preferentially so that its task will release lock as soon as possible. This is accomplished by raising the normalized priority of the other operating system, stored in the priority comparison module 124, to a level higher than the normalized priority of the current operating system (in step 262). Placing the task into a wait state in step 263 causes the current operating system to start the rescheduler. In turn, the rescheduler calls up successively the priority notification module, priority translation module and priority comparison module, whereby the current operating system is replaced by the other operating system whose normalized priority has been elevated.

Figure 15:
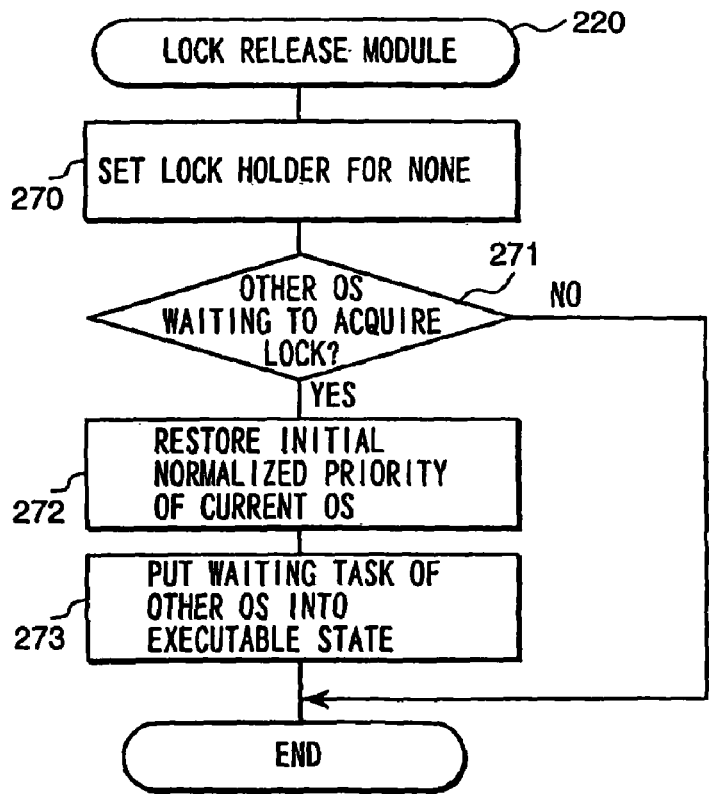
FIG. 15 is a flowchart of steps constituting a process flow of a lock release module under the priority ceiling scheme.

FIG. 15 is a flowchart of steps constituting a process flow of the lock release module 220 under the priority ceiling scheme. The lock release module 220 first releases the lock it holds (in step 270). A check is then made to see if the other operating system is waiting to acquire lock (in step 271). If the other operating system does not wait for lock acquisition, the normalized priority has not be raised, and the execution of the lock release module 220 is terminated here. If the other operating system is waiting to acquire lock, the raising of a normalized priority should have been done to resolve the so-called priority inversion phenomenon. On that assumption, the initial normalized priority of the current operating system is restored (in step 272), and the task waiting to acquire lock is placed into an executable state (in step 273). Upon switching of tasks after the task waiting to acquire lock is made executable, the rescheduler of the other operating system is started. As with the lock acquisition module, the priority comparison module 124 is eventually executed. Then the operating systems are compared in terms of their initial normalized priorities, whereby the operating system with the higher priority of the two is selected.

Figure 16:
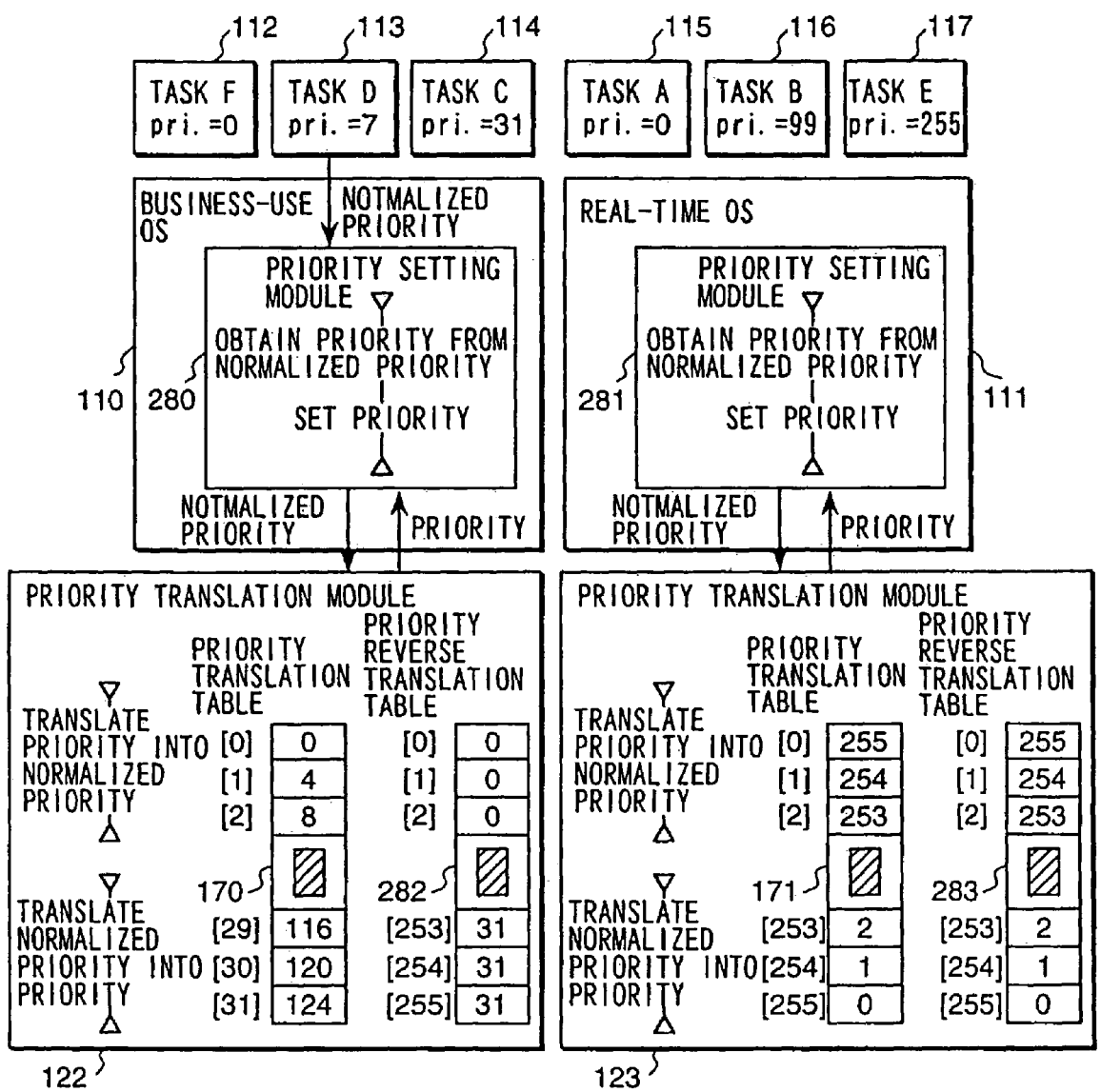
FIG. 16 is a block diagram showing a detailed internal structure of a priority setting module.

Described below is an example in which the priority inheriting scheme is implemented. In this case, as shown in FIG. 16, the operating systems involved must be provided with priority setting modules 280 and 281 for changing task priorities in accordance with normalized priorities. In addition to the function of translating priorities into normalized priorities, the priority translation modules 122 and 123 must comprise a function of translating normalized priorities back to OS-specific priorities. For that purpose, the priority translation modules 122 and 123 possess priority reverse translation tables 282 and 283 wherein normalized priorities are indexed to priorities specific to the individual operating systems.

For a system call, an operating system generally has the ability to change task priorities. The priority setting modules 280 and 281 translate received normalized priorities into priorities specific to the respective operating systems, changing task priorities by use of a task priority change system call. The priority reverse translation tables 282 and 283 functionally support the priority setting modules 280 and 281. Because the normalized priorities range from 0 to 255 in the first embodiment, the priority reverse translation tables 282 and 283 have an array of 256 entries each. Since the priorities for the business-use OS 110 range from 0 to 31, each array element in the priority reverse translation table 282 has an integer that falls between 0 and 31 and satisfies the following inequality (the array is named "revBusiness"):

$$i > j \Rightarrow revBusiness[i] \geq revBusiness[j]$$

where, $0 \leq i$ and $j \leq 255$.

The priorities for the real-time OS 111 range from 0 to 255. The smaller the priority value, the higher the priority for the real-time OS 111. For these reasons, each array element in the priority reverse translation table 283 has an integer that falls between 0 and 255 and satisfies the following inequality (the array is named "revRealtime"):

$$i > j \Rightarrow revRealtime[i] \leq revRealtime[j]$$

where, $0 \leq$ and $j \leq 255$.

In the first embodiment, the normalized priorities range from 0 to 255 and the priorities specific to the real-time OS also range from 0 to 255. This makes it possible to provide one-for-one correspondence between the normalized priorities and the real-time OS priorities. It follows that the priority reverse translation table 283 can be derived uniquely from the priority translation table 171. On the other hand, the priority reverse translation table 282 cannot be determined uniquely because the priorities for the business-use OS range from 0 to 31. In the latter case, the business-use OS priority corresponding illustratively to a normalized priority of "1" cannot be derived from the priority translation table 170. With respect to such normalized priorities that cannot be determined uniquely, the priorities of the business-use OS are suitably established to satisfy the inequality indicated above.

Figure 17:
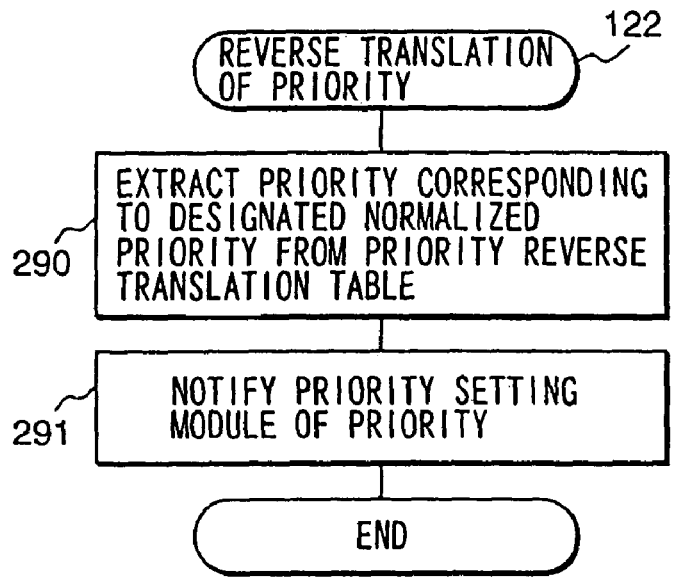
FIG. 17 is a flowchart of steps constituting a process flow of a priority reverse translation function of the priority translation module.

FIG. 17 is a flowchart of steps constituting a process flow of the priority reverse translation function provided by the priority translation module 122. The business-use OS priority corresponding to a designated normalized priority is retrieved from the priority reverse translation table 282 (in step 290), and sent to the priority setting module 280 (in step 291). The priority translation module 123 provides a similar priority reverse translation function.

Figure 18:
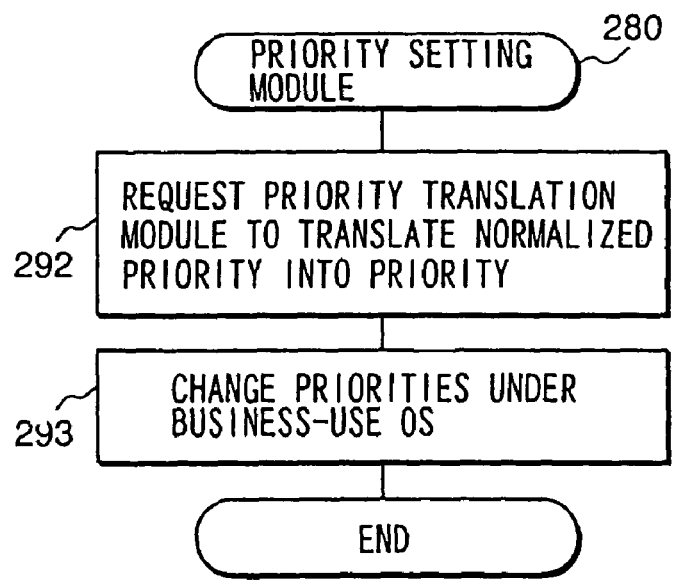
FIG. 18 is a flowchart of steps constituting a process flow of the priority setting module.

FIG. 18 is a flowchart of steps constituting a process flow of the priority setting module 280. The priority setting module 280 first requests the priority translation module 122 to translate a normalized priority into a business-use OS priority (in step 292). Using a priority change system call of the business-use OS, the priority setting module 280 changes the priority of the task in question (in step 293). The priority setting module 281 for the real-time OS 111 carries out similar processing.

Described below is how to implement a typical priority inheriting scheme through the use of the priority reverse translation functions and priority setting modules discussed above.

Figure 19:
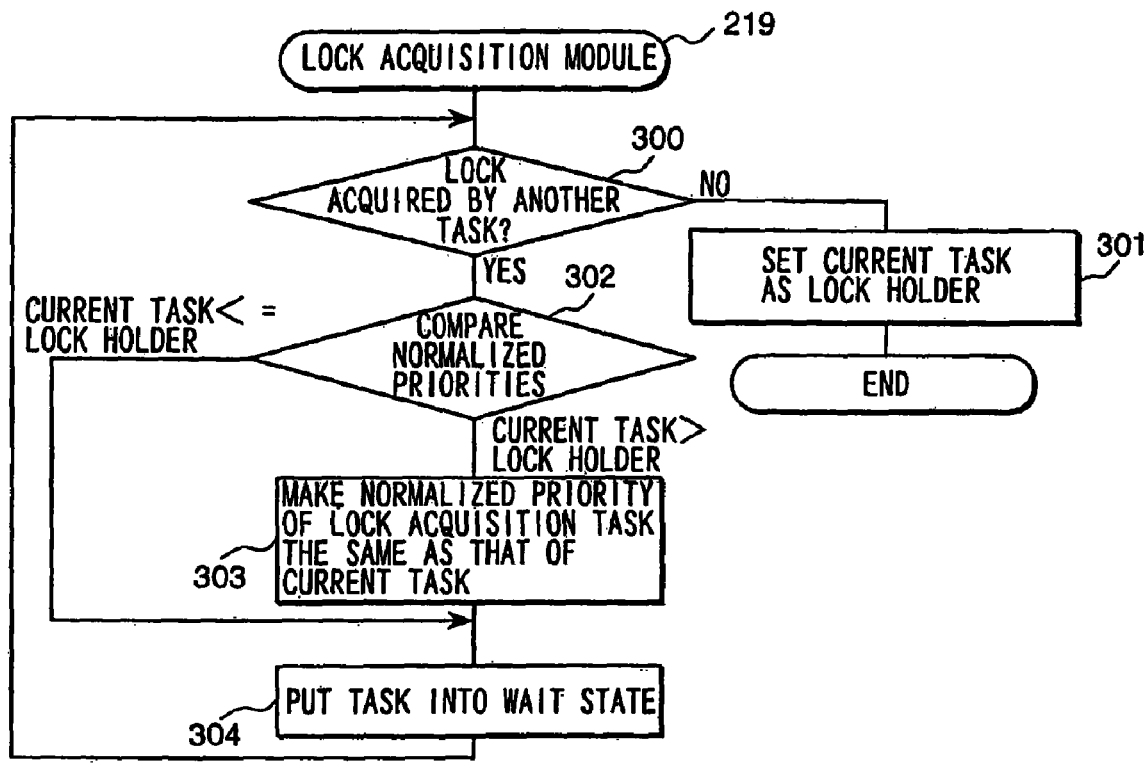
FIG. 19 is a flowchart of steps constituting a process flow of the lock acquisition module under a priority inheriting scheme.

FIG. 19 is a flowchart of steps constituting a process flow of the lock acquisition module 219 subject to the priority inheriting scheme. The lock acquisition module 219 first checks to see if another task has acquired lock (in step 300). If no other task is judged to have acquired lock, the lock acquisition module 219 sets the current task as a lock holder (in step 301). If another task is judged to have acquired lock, the current task needs to be placed in a wait state until lock is released (in step 304). In that case, the lock-acquisition task must be executed preferentially so that the lock will be released as soon as possible. A comparison is made between the normalized priority of the lock-acquisition task and that of the current task (in step 302). If the lock-acquisition task is judged to have a lower normalized priority than the current task, the lock acquisition module 219 causes the lock-acquisition task to inherit the priority of the current task (in step 303). The inheriting of a priority is accomplished by requesting the priority setting module of the operating system running the lock-acquisition task to proceed with the priority setting process, with the normalized priority of the current task designated. If the lock-acquisition task is judged to have a higher normalized priority than the current task, there is no need for the priority to be inherited. The task is then placed immediately into a wait state.

Figure 20:
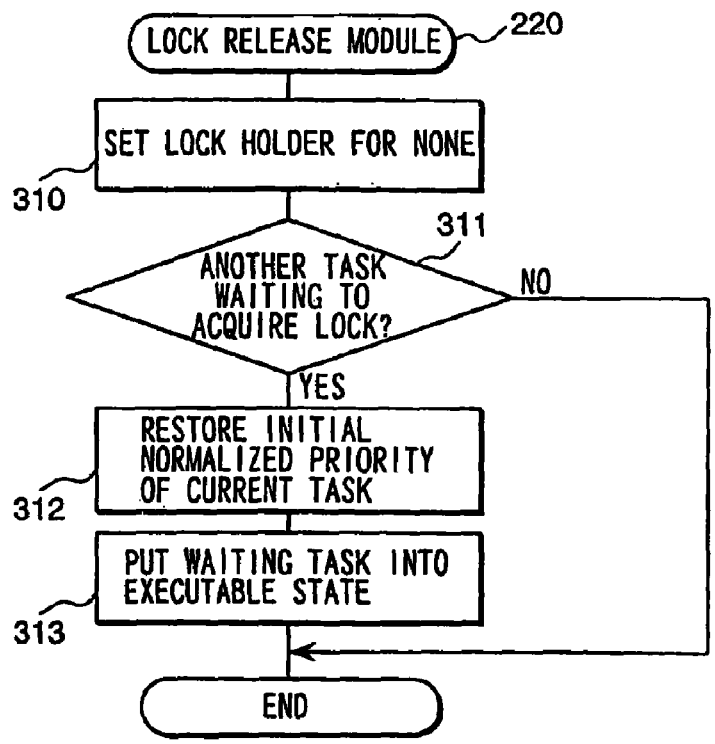
FIG. 20 is a flowchart of steps constituting a process flow of the lock release module under the priority inheriting scheme.

FIG. 20 is a flowchart of steps constituting a process flow of the lock release module 220 under the priority inheriting scheme. The lock release module 220 first releases the lock it holds (in step 310). A check is then made to see if another task is waiting to acquire lock (in step 311). If no other task waits for lock acquisition, that means the normalized priority has not been inherited, and the execution of the lock release module 220 is terminated here. If another task is waiting to acquire lock, that means the normalized priority must have been inherited. On that assumption, the priority setting module is requested to restore the initial normalized priority of the current task (in step 312). The task waiting to acquire lock is then placed into an executable state (in step 313).

Although no specific description has been given in this specification, there may occur an inconsistency in the data denoting the lock holder if an interruption generated during execution of the lock acquisition module 219 or lock release module 220 has led to the switching of tasks. Such contingency should be avoided by performing the interrupt masking function during the lock acquisition or release process.

A viable priority inheriting scheme can be implemented under exclusive control between the operating systems through the use of program modules and process flows depicted in FIGS. 16 through 20. In practice, the use of the process flows of FIGS. 19 and 20 makes it possible to inherit normalized priorities under a single operating system.

Figure 21:
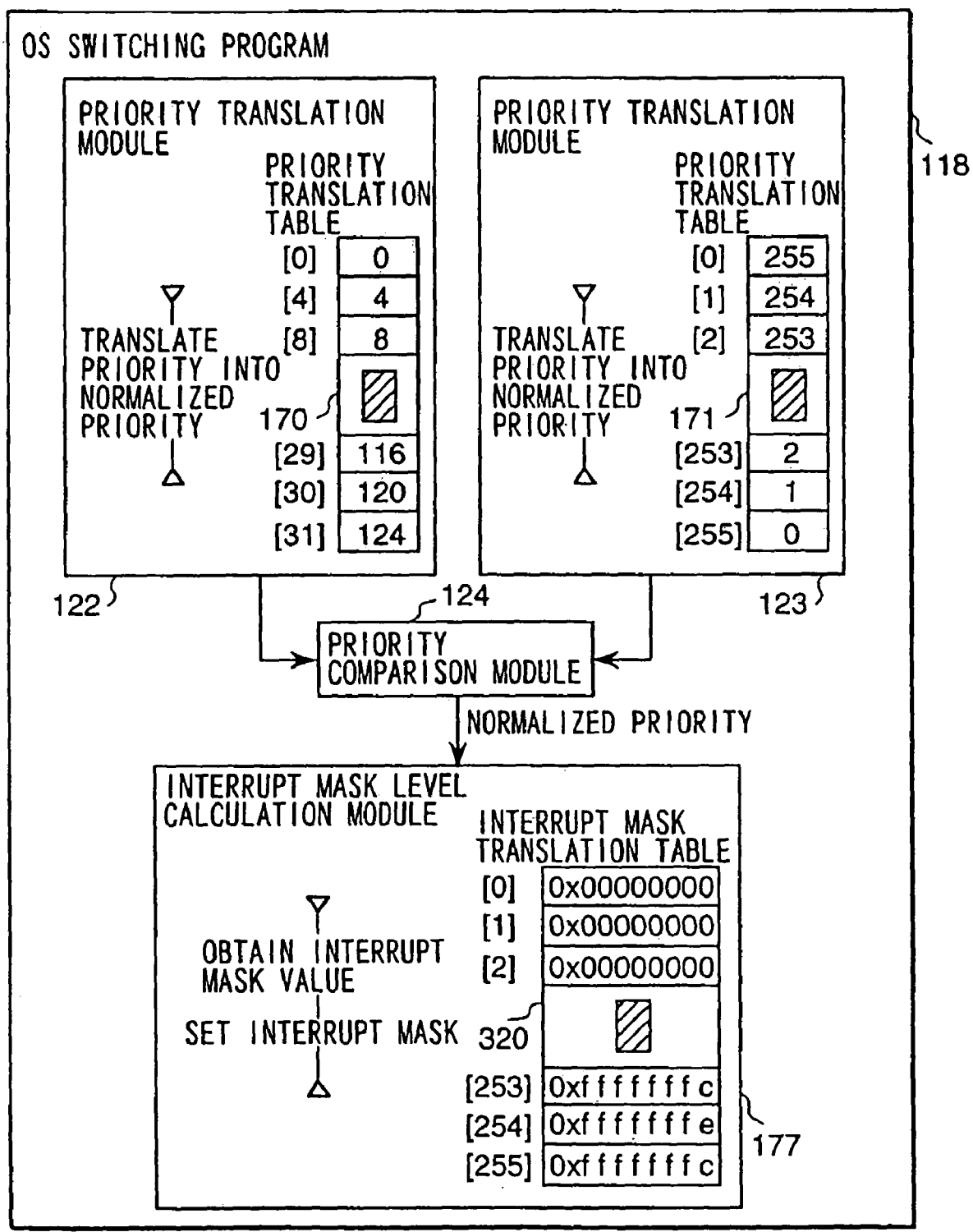
FIG. 21 is a block diagram depicting a detailed internal structure of an interrupt mask level calculation module.

FIG. 21 shows an internal structure of the interrupt mask level calculation module 177. The module 177 provides the function of translating a normalized priority into an interrupt mask level and masking an interruption if its translated level turns out to be higher than a predetermined level. This function is based on the concept that a task whose normalized priority is higher than a predetermined level must be executed in preference to interruptions. Even without this function, the computer works pretty well provided it is capable of masking interruptions by resorting to system calls other function. Still, the interrupt mask level calculation module 177 offers the advantage of automatically effecting interrupt masking whenever the normalized priority exceeds a predetermined value.

The interrupt mask level calculation module 177 has an interrupt mask translation table 320 for executing interrupt masking. The interrupt mask translation table 320 is used to translate normalized priorities into interrupt mask values. As shown in FIG. 4, the first embodiment is applicable to a computer architecture capable of individually masking 32 causes of interruptions. For that reason, each entry in the interrupt mask translation table 320 accommodates data 32 bits long. However, if the four-bit interrupt mask level of FIG. 3 is employed, each entry in the interrupt mask translation table 320 may be reduced to four bits in length. In the example of FIG. 21, the interrupt mask value corresponding to the normalized priority of "0" is 0x00000000 while the interrupt mask value corresponding to the normalized priority of "255" is 0xffffffff. This means that if the normalized priority is "0," then all interruptions are permitted and that if the system is operating with the highest normalized priority, then all interruptions are masked. The necessary masking of interruptions is carried out automatically when the priority comparison module 124 notifies the interrupt mask level calculation module 177 of the normalized priority of the currently executing operating system.

Figure 22:
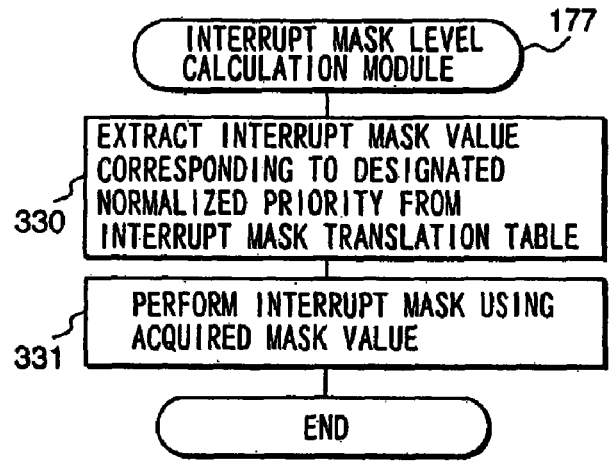
FIG. 22 is a flowchart of steps constituting a process flow of the interrupt mask level calculation module.

FIG. 22 is a flowchart of steps constituting a process flow of the interrupt mask level calculation module 177. First, the module 177 extracts the interrupt mask value corresponding to a designated normalized priority from the interrupt mask translation table 320 (in step 330). The interrupt mask value thus acquired is set illustratively to the interrupt mask register 143, and interrupt masking is executed (in step 331).

The first embodiment of this invention has been described so far. As discussed, the first embodiment allows the operating systems to be switched in keeping with the priority of the task being carried out under each operating system. This embodiment involves incorporating the priority notification module in each of the existing operating systems so that the latter will provide notification of changed priorities every time rescheduling is carried out. However, many of today's commercially available operating systems are not germane to such modifications. Such cases may be dealt with by a second embodiment of the invention which is proposed and discussed below.

Figure 23:
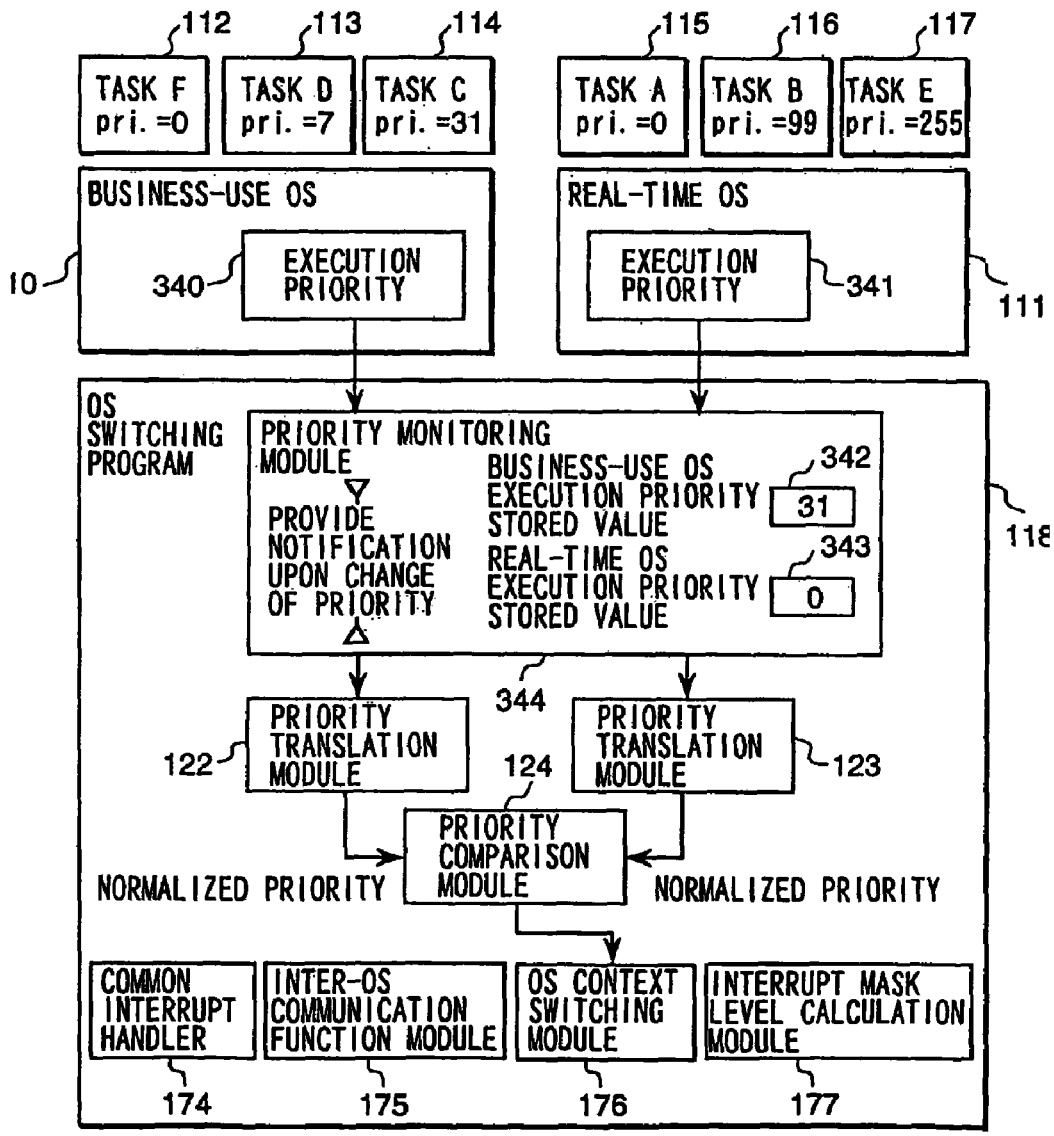
FIG. 23 is a block diagram showing a typical system constitution of a computer practiced as a second embodiment of this invention.

FIG. 23 is a block diagram showing a typical constitution of a computer practiced as the second embodiment of this invention. It is assumed that the business-use OS 110 and real-time OS 111 hold the priorities of their currently executing tasks (execution priorities 340 and 341). That is, under the operating systems, the task management tables 162 and 163 heading the executable task queues 150 and 151 shown in FIG. 5 hold the execution priorities 340 and 341 respectively. If a plurality of executable task queues are assigned to each priority, there is often provided a pointer or a variable; the pointer points to the location of the executable task queue having the highest priority at a given point in time, or the variable (priority-holding variable) indicates the value of the highest priority in question. If the pointer is provided, the execution priorities 340 and 341 are obtained by retracing the executable task queue from the pointer to the task management table for reference thereto; if the variable is provided, the execution priorities 340 and 341 are acquired by retrieving the priority-holding variable in question.

A priority monitoring module 344 is incorporated anew in the operating system switching program 118. The rest of the modules in the operating system switching program 118, i.e., the priority translation modules 122 and 123, priority comparison module 124, common interrupt handler 174, inter-OS communication function module 175, OS context switching module 176 and interrupt mask level calculation module 177, have the same structures and process flows that were discussed above in connection with the first embodiment. There is no priority notification module 120 or 121 in any of the operating systems.

The priority monitoring module 344 retains a business-use OS execution priority stored value 342 and a real-time OS execution priority stored value 343. Started periodically, the priority monitoring module 344 monitors the execution priorities 340 and 341 of the respective operating systems. If the stored execution priority 342 or 343 is found to differ from the current execution priority 340 or 341, a change in the priority is recognized. The priority translation module 122 or 123 is then notified of the new execution priority.

Figure 24:
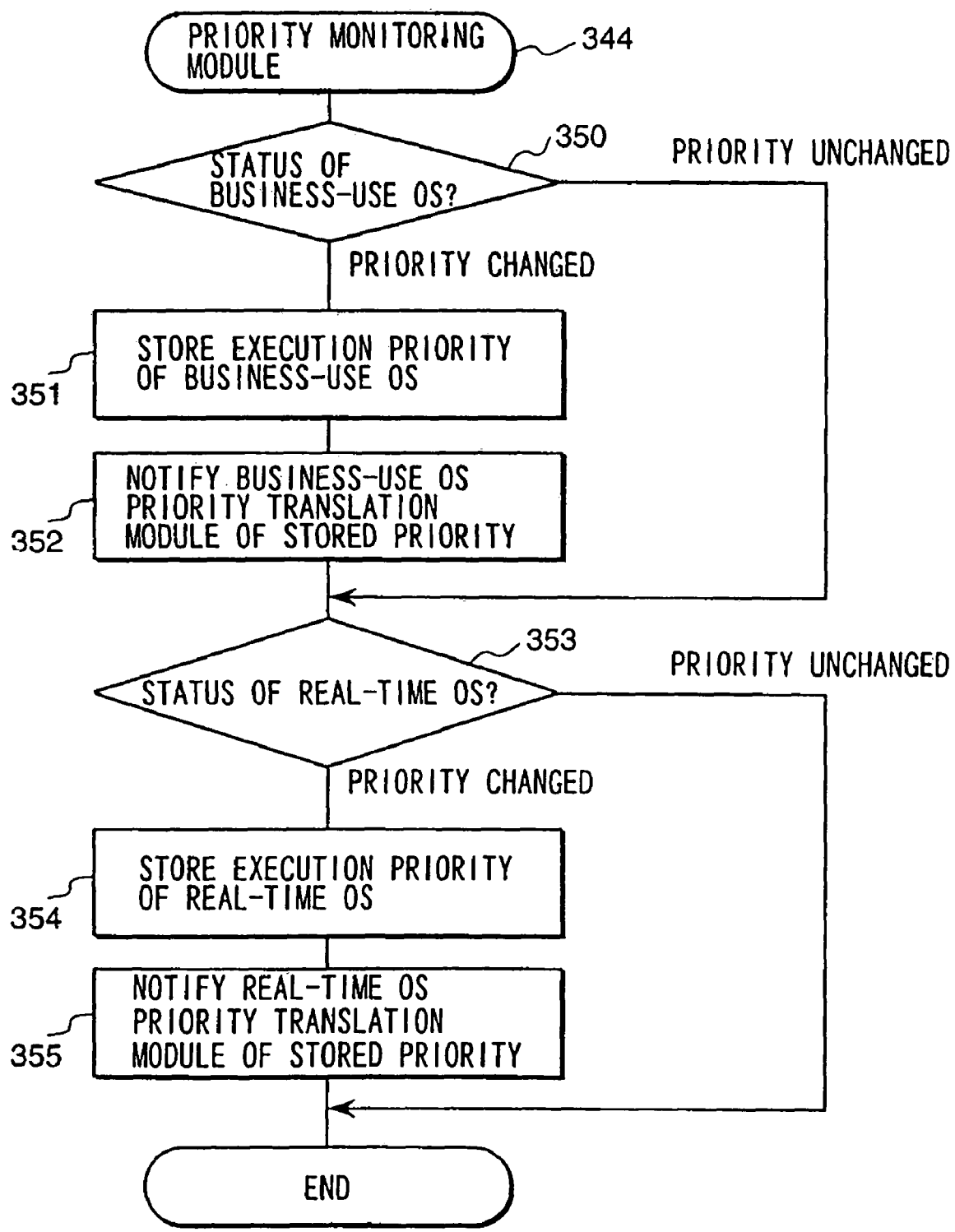
FIG. 24 is a flowchart of steps constituting a process flow of a priority monitoring module.

FIG. 24 is a flowchart of steps constituting a process flow of the priority monitoring module 344. The priority monitoring module 344 first reads out the execution priority 340 of the business-use OS for comparison with the business-use OS execution priority stored value 342 (in step 350). This step is intended to verify whether or not the priority of the business-use OS has changed. If the priority of the business-use OS has not changed, nothing is carried out and step 353 is reached. If a change in the priority is recognized, the execution priority 340 of the business-use OS is set to the business-use OS execution priority stored value 342 (in step 351), and the priority in question is reported to the priority translation module 122 of the business-use OS (in step 352). The same process is carried out on a possible change in the priority of the real-time OS 111. That is, the execution priority 341 of the real-time OS is compared with its execution priority stored value 343 (in step 353). If no change is detected in the priority, the process is terminated. If a change in the priority is detected, the execution priority 341 of the real-time OS is set to the real-time OS execution priority stored value 343 (in step 354). The priority in question is then reported to the priority translation module 123 of the real-time OS (in step 355).

It should be noted that after the operating systems have been switched upon notification of the priority to the priority translation module, control is returned to the beginning of the priority monitoring module 344. In that respect, the monitoring method of FIG. 24 is regarded as one which keeps monitoring priority changes of the business-use OS preferentially. If it is desired to monitor priorities of both operating systems on an equal basis, it is necessary to provide illustratively a modified process flow in which the number of times the priority monitoring module 344 is started is counted so that:

(1) if the module start count is an odd number, the priority of the business-use OS 110 is monitored for change; and (2) if the module start count is an even number, the priority of the real-time OS 111 is monitored for change.

Figure 25:
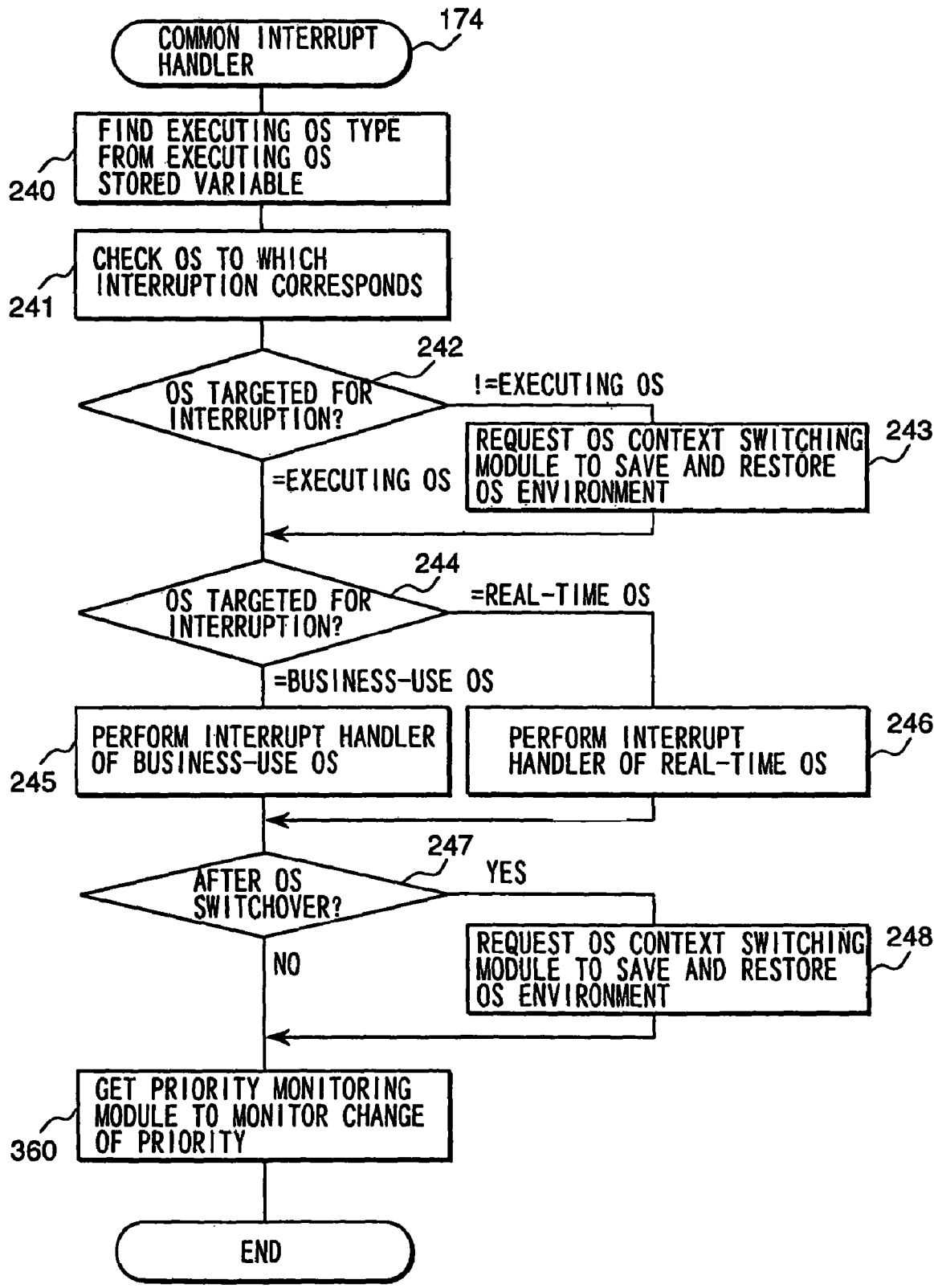
FIG. 25 is a flowchart of steps constituting a process flow of the common interrupt handler that starts the priority monitoring module.

It should be noted that the priority monitoring module 344 is started "periodically" to monitor priority changes. In order to implement periodical monitoring, the priority monitoring module 344 need only be started by timer interrupts. Because all interruptions including timer interruptions and external interruptions are handled collectively by the common interrupt handler 174, the priority monitoring module 344 may be incorporated in the common interrupt handler 174. This arrangement is described below. FIG. 25 is a flowchart of steps constituting a process flow of the common interrupt handler 174 incorporating the priority monitoring module 344. In FIG. 25, steps 240 through 248 are the same as their counterparts in FIG. 12. Starting the priority monitoring module 344 (in step 360) can trigger switching of the operating systems. For that reason, the monitoring of priorities must be effected downstream of the execution of an interrupt handler (step 245 or 246). When the interrupt handler 152 or 153 returns control to the common interrupt handler 174, the monitoring on priority changes is automatically started. The operating systems are switched as needed. When the priority monitoring module 344 judges that there is no need to switch the operating systems, the processing of the common interrupt handler 174 is terminated.

The second embodiment of this invention has no means for notifying the priority translation module of any priority change that may take place immediately after rescheduling. Because priority changes are checked at constant intervals, the operating systems are not switched immediately in response to a change in the priority. For this reason, the second embodiment constitutes a computer which requires no internal modifications in its operating systems but which is subject to a reduced level of switching efficiency compared with the first embodiment.

Figure 26:
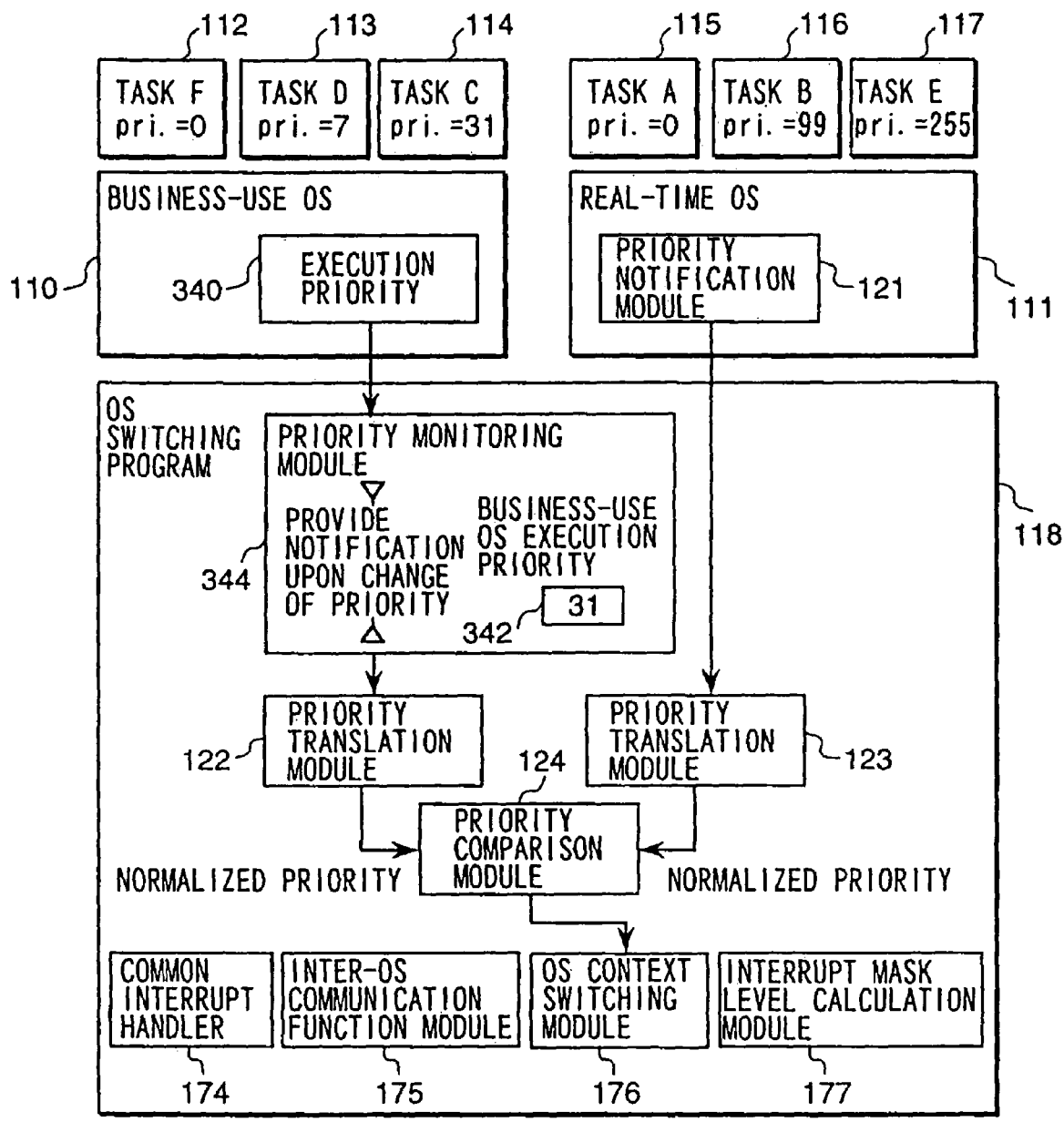
FIG. 26 is a block diagram showing a typical system constitution of a computer practiced as a third embodiment of this invention.

The second embodiment satisfies the requirement that both operating systems be left unmodified internally. Alternatively, there may be a situation where the real-time OS 111 is ready for such internal modifications but the business-use OS 110 is not. That situation may be addressed by a third embodiment of the invention wherein the real-time OS 111 incorporates the priority notification module 121, with the priority monitoring module 344 monitoring only priority changes of the business-use OS 110 (FIG. 26).

As another alternative, the priority notification module may be built not into the reschedulers but into periodically activated components such as a timer interrupt handling module in each operating system. The arrangement substitutes for the priority monitoring module 344.

Figure 27:
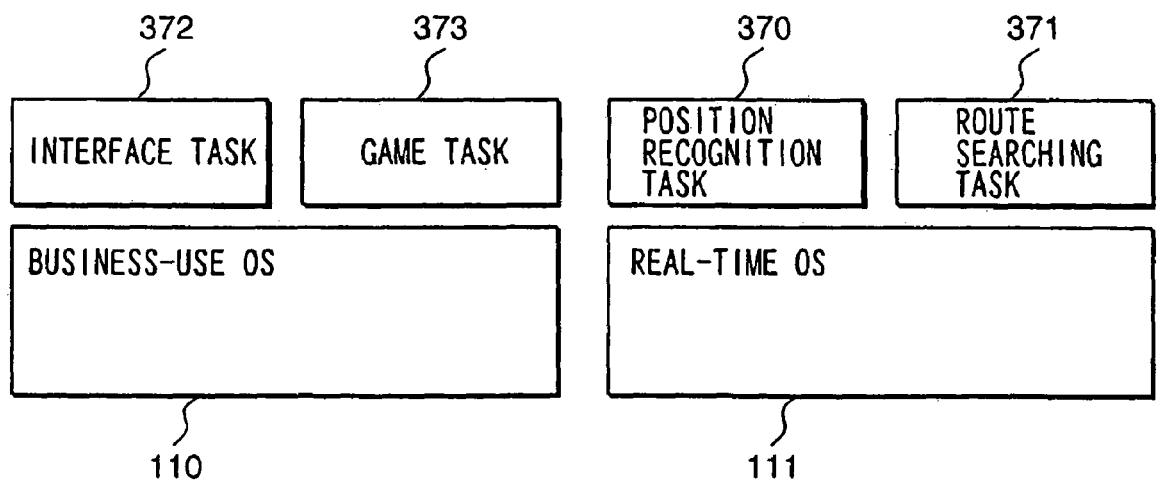
FIG. 27 is a schematic view illustrating how tasks are typically apportioned between operating systems.

When any of the above-described embodiments is applied to a car navigation system shown in FIG. 27, inputs from the user can be accepted even during a time-consuming operation of a route searching task in the system. In the setup of FIG. 27, an interface task is assigned a higher normalized priority than the route searching task. The push of a button by the user to start the interface task replaces the real-time OS with the business-use OS executing the task of the higher normalized priority. As a result, the interface task is carried out even while the route searching task subject to a prolonged processing time is operating.

There are virtual computers each comprising a plurality of operating systems. Applying this invention to any one of such computer systems makes it possible to run its multiple operating systems having different priority schemes in accordance with the priorities of their tasks to be carried out.

The inventive arrangements discussed above combine to make up a computer that concurrently offers advantages of two different operating systems: the user interface of the business-use OS, and high reliability of the real-time OS.

Figure 29:
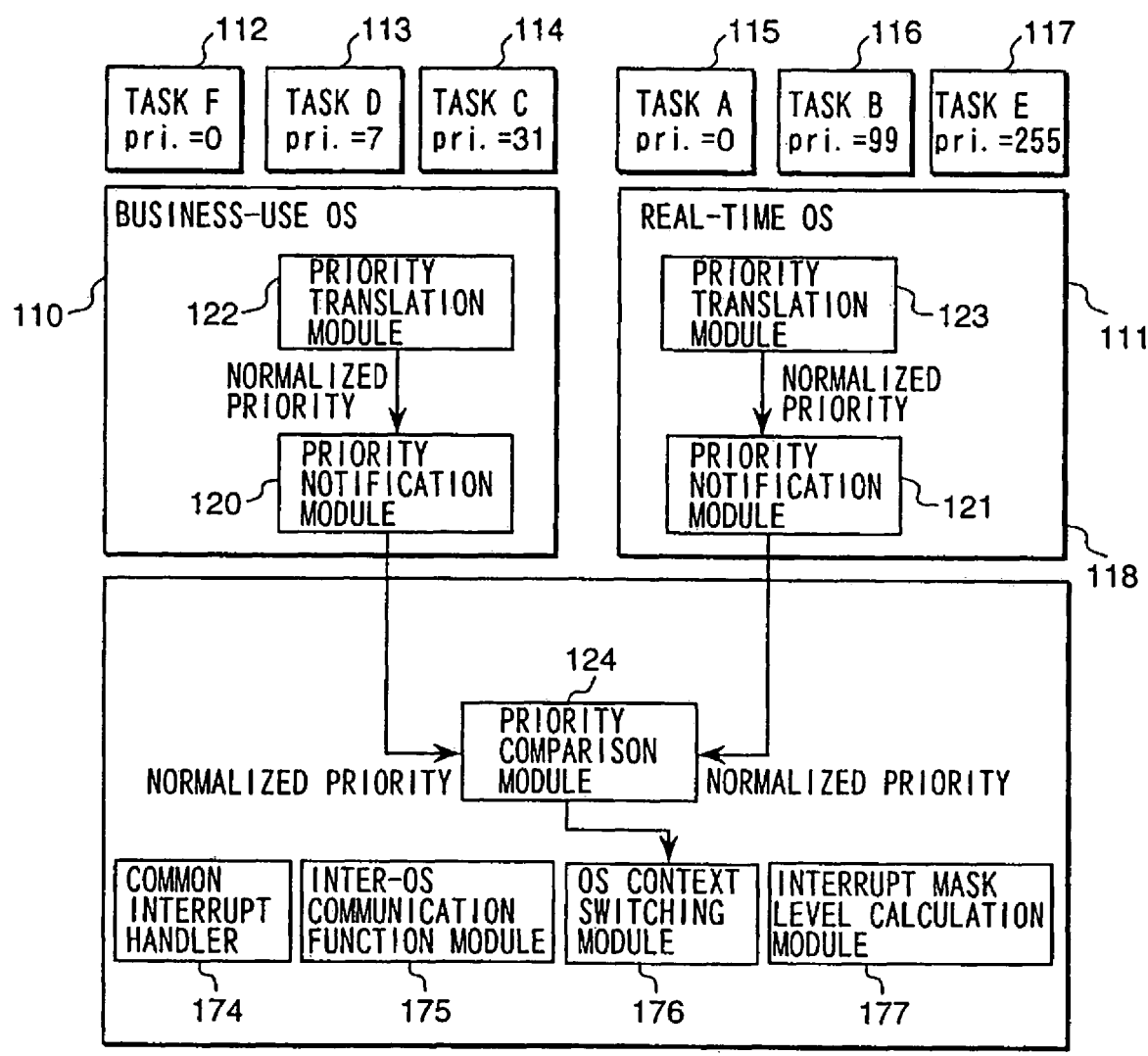
FIG. 29 is a block diagram showing a typical system constitution of a computer practiced as a fourth embodiment of this invention.

Each of the first through the third embodiments above of the invention is structured to translate priorities within the operating system switching program 118. Alternatively, the priority translation modules 122 and 123, which correspond respectively to the business-use OS 110 and real-time OS 111, may be built into these operating systems. A fourth embodiment of the invention shown in FIG. 29 is designed to accommodate such modifications.

In the fourth embodiment, the priority translation modules 122 and 123 translate the priorities of both operating systems into normalized priorities. In turn, the priority notification modules 120 and 121 notify the priority comparison module 124 of the resulting normalized priorities representing the operating systems.

In the fourth embodiment, all interfaces between the business-use OS 110 and real-time OS 111 on the one hand and the operating system switching program 118 on the other hand are effected in accordance with normalized priorities. Each of the first through the third embodiments above provides notification of the priority of a task when that task is an executable one, and reports an idle state if there is no executable task. Such idle states as well as self-processing states of the operating systems cannot be mapped freely in the order of normalized priorities representative of the states. With the fourth embodiment, by contrast, priorities are translated into normalized priorities under each operating system. That is, those states other than the state of task execution can be mapped freely in the order of their normalized priorities.

As described and according to the invention, a computer with a single processor running a plurality of operating systems allows these operating systems to be switched according to the priorities of tasks executed thereby so that tasks of higher priorities are always carried out ahead of those of lower priorities. According to the invention, the operating systems are compared in terms of priorities by their priority translation modules translating task priorities into normalized priorities. Thus real-time responsiveness and efficiency are preserved for a computer that runs a plurality of operating systems subject to different priority schemes.

As many apparently different embodiments of this invention may be made without departing from the spirit and scope thereof, it is to be understood that the invention is not limited to the specific embodiments thereof except as defined in the appended claims.

What is claimed is:

1. A computer comprising:
    a memory for storing a plurality of operating systems and a plurality of processes or threads to be performed by each of said operating systems; and
    a processor for executing said plurality of operating systems in accordance with task priorities assigned to said processes or threads;
    wherein said processor retrieves the task priorities of processes or threads to be performed by any one of said operating systems, translates the retrieved task priorities assigned to said processes or threads into normalized operating system priorities in a range common to said plurality of operating systems, selects the operating system to be executed in accordance with the normalized operating system priorities resulting from the translation, and executes the selected operating system,
    wherein the selected operating system is to perform a process or thread at a higher normalized operating system priority compared to other normalized operating system priorities,
    wherein at least two operating systems of the plurality of operating systems have different priority schemes, and translating task priorities assigned to said processes or threads into normalized operating system priorities includes adjusting for priority scheme difference between the at least two operating systems.

2. A computer according to claim 1, wherein said memory comprises a priority translation table in which to map into the normalized operating system priorities the task priorities of the processes or threads to be performed by said operating systems, and wherein said processor selects the operating system to be executed on the basis of said priority translation table.

3. A computer according to claim 2, wherein said processor determines task priorities specific to each of said plurality of operating systems on the basis of the normalized operating system priorities common to said operating systems, thereby changing the task priorities of said plurality of processes or threads to be performed by each of said operating systems.

4. A computer according to claim 3, wherein said memory comprises a priority reverse translation table in which to map said normalized operating system priorities into the task priorities specific to each of said operating systems, and wherein said processor changes the task priorities of said plurality of processes or threads on the basis of said priority reverse translation table.

5. A computer according to claim 2, wherein if a process or a thread is designated for execution, said processor elevates the operating system priority of the operating system in charge of carrying out the designated process or thread, the processor further lowering the operating system priority of the operating system in question when said designated process or thread is terminated in execution.

6. A computer according to claim 1, wherein said processor determines task priorities specific to each of said plurality of operating systems on the basis of the normalized operating system priorities, thereby changing the task priorities of said plurality of processes or threads to be performed by each of said operating systems.

7. A computer according to claim 6, wherein said memory comprises a priority reverse translation table in which to map normalized operating system priorities into the task priorities specific to each of said operating systems, and wherein said processor changes the task priorities of said plurality of processes or threads on the basis of said priority reverse translation table.

8. A computer according to claim 7, wherein if a process or a thread is designated for execution, said processor elevates the operating system priority of the operating system in charge of carrying out the designated process or thread, the processor further lowering the operating system priority of the operating system in question when said designated process or thread is terminated in execution.

9. A computer according to claim 6, wherein if a process or a thread is designated for execution, said processor elevates the operating system priority of the operating system in charge of carrying out the designated process or thread, the processor further lowering the operating system priority of the operating system in question when said designated process or thread is terminated in execution.

10. A computer according to claim 1, wherein, if a process or a thread is designated for execution, said processor elevates the operating system priority of the operating system in charge of carrying out the designated process or thread, the processor further lowering the operating system priority of the operating system in question when said designated process or thread is terminated in execution.

11. A non-transitory data storage medium accommodating:
a plurality of processes or threads;
a plurality of operating systems that execute with a processor, for performing said plurality of processes or threads and providing notification of a priority of a currently executing process or thread;
a priority translating step of translating task priorities associated with the plurality of processes or threads sent from any one of said operating systems into normalized operating system priorities in a range common to said plurality of operating systems; and
a priority comparing step of comparing the normalized operating system priorities obtained by said priority translating step in order to select and execute preferentially the operating system to perform a process or thread having a higher normalized operating system priority,
wherein at least two operating systems of the plurality of operating systems have different priority schemes, and translating task priorities associated with the plurality of processes or threads into normalized operating system priorities includes adjusting for priority scheme difference between the at least two operating systems.

12. An operating system execution method for selectively executing any one of a plurality of operating systems that execute with a processor, said operating system execution method comprising the steps of:
translating priorities of processes or threads to be performed by each of said operating systems into normalized operating system priorities in a range common to said plurality of operating systems; and
comparing the normalized operating system priorities obtained by the priority translating step in order to select and execute preferentially the operating system to perform a process or thread having a higher normalized operating system priority,
wherein at least two operating systems of the plurality of operating systems have different priority schemes, and translating priorities of processes or threads to be performed by each of said operating systems into normalized operating system priorities includes adjusting for priority scheme difference between the at least two operating systems.

13. An operating system execution method according to claim 12, wherein said priority translating step, in translating task priorities specific to each of said operating systems into normalized operating system priorities, translates the task priorities of different operating systems into normalized operating system priorities that differ between said different operating systems.

14. An operating system execution method according to claim 13, wherein said priority translating step, besides translating task priorities of processes or threads to be performed by each of said operating systems into the normalized operating system priorities, translates at least an interrupt handling state, a self-processing state of any operating system, and an idle state into common priorities.

15. An operating system execution method according to claim 12, wherein said priority translating step, besides translating task priorities of processes or threads to be performed by each of said operating systems into the normalized operating system priorities, translates at least an interrupt handling state, a self-processing state of any operating system, and an idle state into common priorities.

16. A computer system including a processor and having a plurality of operating systems that execute with the processor, and switching means for switching said plurality of operating systems, each of said operating systems performing a plurality of processes or threads in accordance with task priorities assigned to said processes or threads:
wherein each of said plurality of operating systems further comprises priority translating means for translating the task priorities of said processes or threads performed by the respective operating systems into normalized operating system priorities that are in a range common throughout said computer system, and priority notifying means for notifying said switching means of the normalized operating system priorities obtained by said priority translating means; and
wherein said switching means further comprises priority comparing means for comparing the normalized operating system priorities sent from each of said operating systems in order to select and execute preferentially the operating system to perform a process or thread having a higher common priority, wherein at least two operating systems of the plurality of operating systems have different priority schemes, and translating the task priorities of said processes or threads performed by the respective operating systems into normalized operating system priorities includes adjusting for priority scheme difference between the at least two operating systems.

* * * * *